United States Patent [19]

Furusawa et al.

[11] Patent Number: 4,970,544

[45] Date of Patent: Nov. 13, 1990

[54] PAPER TRAY CONTROL SYSTEM

[75] Inventors: Tsutomu Furusawa; Kazuyuki Sakaguchi; Takanobu Suzuki, all of Kanagawa, Japan

[73] Assignee: Fuji Xerox Co., Ltd., Tokyo, Japan

[21] Appl. No.: 276,494

[22] Filed: Nov. 25, 1988

[30] Foreign Application Priority Data

Nov. 26, 1987 [JP] Japan ................................ 62-298531
Dec. 1, 1987 [JP] Japan ...................................... 304169

[51] Int. Cl.[5] .............................................. G03B 27/52

[52] U.S. Cl. ...................................... 355/24; 355/204; 355/311

[58] Field of Search ............... 355/133, 206, 204, 205, 355/311, 24

[56] References Cited

U.S. PATENT DOCUMENTS 4,306,803 12/1981 Donohue et al. .................. 355/204

FOREIGN PATENT DOCUMENTS 50-62644 5/1975 Japan .
57-77140 5/1982 Japan .
59-78371 5/1984 Japan .
62-179792 11/1987 Japan .
62-194634 12/1987 Japan .
63-38152 3/1988 Japan .
63-59462 4/1988 Japan .
63-191173 8/1988 Japan .

OTHER PUBLICATIONS

Sheikh, Siklandar, "A Programmable Digital Control System for Copying Machines", IEEE Transactions on Industrial Electronics and Control Instrumentation, vol. IECI—21, No. 1, pp. 25—33, Feb. 1984.

*Primary Examiner*—L. T. Hix
*Assistant Examiner*—D. Rutledge
*Attorney, Agent, or Firm*—Finnegan, Henderson, Farabow, Garrett, and Dunner

[57] ABSTRACT

A paper tray control system includes a recording apparatus for recording image data on a paper, to which additional devices are attachable; a paper tray installed in the recording apparatus as the additional devices for stocking the paper on which the image data has been recorded; and main controller for controlling the recording apparatus and for generating an instruction. The paper tray control system is further provided with a tray control separated from the main controller for controlling the paper tray; and a communication line connected between the main controller and the tray controller, wherein the tray controller receives the instruction from the main controller through the communication line to control the paper tray according to the instruction.

11 Claims, 37 Drawing Sheets

FIG. 22(c)

| | | | |
|---|---|---|---|
| | E5# ILK | RHND #ILK | DUPL @ Q'TY |
| | DIAG # STRT | DIAG @ COD | |

FIG. 23(a)

| | | |
|---|---|---|
| | DFLT @ COD | OPTN @ SEL |
| | DIAG @ ANH | OPTN @ SEL |

FIG. 23(b)

| | | | | | | | |
|---|---|---|---|---|---|---|---|
| | DDM¥ HLK | DDM ¥NOP | DDM ¥BH,G | DDM ¥DRV | C6¥ JAM | DTRY ¥OK | DDM¥ TILK |
| | | | | DIAG @ COD | | | |

FIG. 23(c)

| | | | | |
|---|---|---|---|---|
| | DFH ¥JAM | C7¥ JAM | — | HCF @ SIZ |
| | DFH ¥JAM | C4¥ JAM | C5¥ JAM | 4TRY @ SIZ |
| | DFM ¥JAM | | | |

FIG. 23(d)

| | | | | |
|---|---|---|---|---|
| | HCFV NOP | HCF ¥ILK | HCF¥ RDY | ELEV @ FLT |
| | — | | | 5 TRY @ SIZ |
| | HCF¥ DIAG | | | |

PAPER TRAY CONTROL SYSTEM

BACKGROUND OF THE INVENTION

1. Field of the Invention

The present invention relates to recording apparatus such as copying machines, facsimiles, printers, etc. for recording image data and more particularly to a paper tray control system for use in an apparatus in which various additional devices can be fitted to its base machine.

2. Prior Art

With the spreading use of copying machines in recent years, user requirements tend to become diversified and those which have sophisticated functions have been developed and put on the market in order to deal with the diversified requirements. Relatively new functions being performed by those copying machines include a function of setting a copy contraction/expansion ratio of an original optionally adjustable at the rate of 1% of its dimension, a multicolor copying function using more than two kinds of toner, a monochromatic copying function using one selected color: a continuous copying function on a page-to-page basis by which double-spread two pages of a bookbinding original are copied without moving the original itself; a function of automatically continuously copying both sides of an original or of automatically continuously copying both sides of copied paper; and editing function by which a plurality of originals are edited and copied through synthesizing them or deleting some of them; a job memory function by which copying conditions stored in IC cards are inputted to set the copying conditions automatically; and many other functions.

The trend is for not only copying machines but also other kinds of recording apparatus such as facsimiles and printers for recording image data to be commonly made multifunctional and sophisticated.

Even though the apparatus is set multifunctional, however, all of its functions are rarely employed at all times but some of them are rather partially used, depending on the business or place in which it is installed. Consequently, there has been adapted an arrangement of models ready for supply, ranging from high-class models equipped with all sorts of functions up to special models offering a combination of various functions so that users are allowed to select one of the models capable of meeting their requirements. Moreover, some models are designed so that additional devices are attached in conformity with user requirements to their satisfaction. In any case, a function selective mechanism comprising various switches, buttons or keys is disposed on the console panel in order that any desired functions can be selected from among those provided and started.

An intermediate tray is also one of the additional devices fitted to a copying machine. Once the intermediate tray is added thereto, the paper used to record data can be stocked thereon and reused to record new data. In other words, one sheet of paper can be used to record data several times. A stock mode of the intermediate tray consists of a dual mode in which paper is stocked in such a manner that the preceding recording side is set as a recording side again and a duplex mode in which the back of the preceding recording side is set as a recording side. When the intermediate tray is used in the one or the other mode, the paper used for recording in the body is conveyed up to and stocked on the intermediate tray before being fed to a recording means of the body. Consequently, a conveyer line becomes long and, particularly when a plurality of sheets of paper are continuously designated for recording, the plurality of sheets are involved on the conveyer line extending from the recording means up to the tray. A jam check is therefore imposed on not only the conveyer line of the body but also that of the intermediate tray.

While the aforesaid apparatus is made multifunctional and sophisticated, it ought to become convenient to its user and offer a wide range of application to that extent. On the other hand, it has also posed various problems. In the case of a copying machine equipped with the intermediate tray as an additional device, for instance, copies can be taken in the duplex mode and this makes it necessary to arrange a control circuit for use in taking a one-side copy of a one-side original and a duplex copy of a one-side original. Provided an original autofeeder for use in duplex coping is installed, moreover, a duplex original-duplex copy mode is further added. In the copying machine having the intermediate tray, copy-taking becomes possible in color-making, continuous copying color dualizing, sheet dualizing, parallel dualizing and partial color conversion modes even in the dual mode. As a result, an apparatus adapting a control system capable of exercising control in those modes has to be designed. As the control system varies with the specification of the apparatus, a control device has to be designed to suit each function thereof. Taking a tray for storing recording paper as an example, software for controlling an intermediate tray for duplex recording and editing purposes is provided in a ROM as what is used to control the apparatus proper when the intermediate tray in addition to general trays is installed as an additional device. Accordingly, the memory area of the apparatus proper is ate away as the number of functions added increases.

If attention is turned to part of control on the intermediate tray module (DDM) side, for instance, what becomes necessary on the part of DDM is data of the length and width of paper to be stocked. Accordingly, data on whether the kind of paper for use is of the AB or inch series and what size the paper is has to be specified; the problem is that the number of items of data to be specified increases as the number of paper sizes increases. In case an emergency interrupting situation occurs in the course of conveying paper, it becomes problematical how it has to be dealt with and what kind of control should be exercised therefore. When the main machine is stopped in case of emergency; e.g., jamming or interlock opening, sheets of paper stored in the DDM are set free and displaced as the tray is drawn out. For this reason, jamming and skewing may occur immediately after the operation of the apparatus is restarted.

Procedure and control peculiar to each apparatus becomes necessitated once additional devices are attached and the control system varies as the specification of the apparatus is changed, for example, because of the presence or absence of the additional device. Consequently, its control unit has to be so designed as to suit each combination of additional devices and their functions. Accordingly, the memory area of the apparatus proper is ate away as the number of functions added increases.

SUMMARY OF THE INVENTION

The present invention is intended to solve the aforesaid problems and it is therefore an object of the invention to provide a paper tray control system which permits attaching additional devices, standardizing programs for controlling an apparatus proper, irrespective of the presence or absence of the additional devices and economizing a memory area in the apparatus proper.

It is another object of the present invention to provide a paper tray control system which permits efficiently controlling an intermediate tray installed as an additional device in a manner specifically required for the intermediate tray, standardizing programs for controlling an apparatus proper and economizing a memory area in the apparatus proper.

In view of the foregoing, the paper tray control system for an apparatus so constituted according to the present invention as to set a paper tray attachable as an additional device as shown in FIG. 1A comprises a main control means 13 for controlling a base machine 12 and a tray control means 15 for controlling a paper tray 14, and is characterized in that a communication line 17 connects the main control means 13 and the tray control means 15 to have the tray controlled under instructions from the main control means 13. Accordingly, programs for controlling the paper tray as an additional device in this system are provided in a memory 16 of the tray control means 15, whereas the tray control means 15 selects a program stored in the memory 16 under instructions from the main control means 13 and starts its operation. The matching of the tray control means 15 with other units and functions are totally established by the operating signal controlled by the main control means 13.

Further, the stock control system for an apparatus so constituted according to the present invention as to set a paper tray attachable as an additional device as shown in FIG. 1B comprises a main control means 13 for controlling a base machine 12 and a tray control means 15 for controlling a paper tray 14 and is characterized in that a communication line 17 connects the main control means 13 and the tray control means 15 to have the tray controlled under instructions from the main control means 13. Size data included in the stock control instructions is transmitted from the main control means 13 to effect the operation of fitting the size of sheets of paper sent for stocking, whereas a stock control mechanism 18 is controlled so that it is stopped after the paper in the course of being stocked by the tray control means 15 has been stocked completely.

In the paper tray control system with the aforesaid means thus provided according to the present invention, on receiving data and instructions as to paper tray control from the main control means 13, the tray control means 15 under the control of the main control means 13 judges the paper tray control mode involved according to the data and controls the storage and feeding of paper. When the intermediate tray having the duplex and dual modes is set, for instance, the designated side of paper is turned up while it is being stored on the intermediate tray, depending on which mode, i.e., the duplex or dual mode, is designated. In other words, the conveyer line is controlled so that the paper with its copied side turned up is stored when the dual mode is designated.

In the paper tray control system with the aforesaid means thus provided according to the present invention, data of paper size included in the instructions as to the stock control over the paper tray is transmitted from the main control means 13 to the tray control means 15 to effect the setting of the size of the paper to be stocked on the intermediate tray by the tray control means 15. Thereafter, sheets of paper are conveyed in conformity with the set number of them without designating the paper size each time one sheet of paper is conveyed. When the operation of the base machine 12 is interrupted because of jamming and interlock opening, moreover, the paper is also stopped from being stocked in accordance with the paper size set by the tray control means 15 on immediately transmitting an emergency interruption signal from the main control means 13.

BRIEF DESCRIPTION OF THE DRAWINGS

FIGS. 2–18 are illustrative of a copying machine to which the present invention is applied, in which;

FIG. 2 is a system configuration of a copying machine;

FIG. 3 is an external view illustrating an example of the system configuration of the copying machine;

FIG. 4 is a schematic block diagram of the copying machine;

FIG. 5 is a top view of a console panel of the copying machine;

FIG. 6 is a circuit diagram outlining a circuit configuration of the copying machine;

FIG. 7 is a developed block diagram of FIG. 6, centering around a main CPU;

FIG. 8 is a block diagram illustrating the details of a circuit configuration around a photoreceptor drum of the copying machine;

FIG. 9 is a timing chart illustrating the operations of a main motor and a developing solenoid when first development is made by a sub-developing device and when second development is made by a main developing device;

FIG. 10 is a timing chart illustrating the operations of the main motor and the developing solenoid when first development is made by the main developing device and when second development is made by the sub-developing device;

FIG. 11 is a block diagram illustrating the details of an exposure system and the periphery of a console control unit of the copying machine;

FIG. 12 is a block diagram illustrating the details of a power supply and a fixing device of the copying machine;

FIG. 13 is a block diagram illustrating the details of a circuit configuration of a copy paper conveying system;

FIG. 14 is a schematic block diagram of a DADF;

FIG. 15 is a perspective view of a sorter;

FIG. 16 is a perspective view illustrating the system configuration of the copying machine fitted with an editor pad;

FIG. 17 is a top view of the editor pad; and

FIG. 18 is a top view illustrating an editor panel and a display panel;

FIGS. 19–45 are illustrative of an embodiment of the present invention, in which;

FIG. 19 is a schematic block diagram of an overall paper tray control system;

FIG. 20 is a serial communication timing chart;

FIG. 21 is a diagram illustrating the structure of serial communication data between a main controller and a tray controller;

FIG. 22 is a diagram explanatory of a serial reception signal;

FIG. 23 is a diagram explanatory of a serial transmission signal;

FIG. 24 is a diagram illustrating an intermediate tray control system configuration;

FIG. 25 is a schematic view of a conveyor system centering around the intermediate tray;

FIG. 26 is a diagram exemplifying the operational timing of an intermediate tray module;

FIG. 27 is a diagram exemplifying a fourth-fifth supply tray control system configuration;

FIG. 28 is a diagram exemplifying a large capacity tray control system configuration;

FIG. 29 is a schematic block diagram of a paper supply means equipped with the intermediate tray and the large capacity tray as additional devices;

FIG. 30 is a schematic block diagram of a paper supply means equipped with the fourth and fifth supply FIG. 31 is a diagram exemplifying the operational timing of the fourth and fifth supply trays;

FIG. 32 is a diagram exemplifying the operational timing of the large capacity tray;

FIG. 33 is a diagram illustrating a general tray control flow;

FIG. 34 is a diagram illustrating a stock control process flow for the intermediate tray;

FIG. 35 is a diagram illustrating a size identifying process flow while power is on;

FIG. 36 is a diagram illustrating a control flow at the time of a DDM stock mode;

FIG. 37 is a diagram illustrating a control flow at the time of DDM feeding;

FIGS. 38–40 are illustrative of details of the process steps of FIGS. 35–37;

FIG. 41 is a diagram explanatory of the operation of a side guide;

FIG. 42 is a diagram illustrating a side guide control flow with a DDM front sensor in the off-state at the time of the stock mode;

FIG. 43 is a diagram illustrating a side guide initial setting control flow in the stock mode;

FIG. 44 is a diagram illustrating a side guide control flow at the time of DDM emergency interruption; and FIG. 45 is a diagram illustrating a side guide control flow after the closing of a DDM tray interlock followed by the opening thereof in a feed mode.

DETAILED DESCRIPTION OF THE PREFERRED EMBODIMENTS

A detailed description will subsequently be given of an embodiment of the present invention.

Contents:

In this embodiment, a copying machine is taken up as an example of a recording apparatus and reference will be made to an intermediate tray employed as duplex and duel modules, a large capacity tray, and an ordinary additional paper supply tray which are added separately from paper trays incorporated in the copying machine proper, together with selective displays by way of example. Prior to the description of the embodiment to be given, headings of the description thereof will be shown. In the following description, (1)–(5) refer to the overall construction of the copying machine to which the present invention is applied and (6) to the embodiment wherein a paper tray control system according to the present invention is adopted with the aforesaid arrangement.

(1) System configuration of copying machine.
(2) Software package.
 (2-1) Advantages of software combination; and
 (2-2) Examples of differentiation.
(3) Construction of exemplified apparatus.
(4) Circuit configuration of the apparatus.
(5) Detailed circuit configuration of copying machine:
 (5-1) Periphery of photoreceptor drum;
 (5-2) Switching mechanism of developing device;
 (5-3) Optical system;
 (5-4) Fixing device;
 (5-5) Control of console;
 (5-6) Billing counter;
 (5-7) Power supply;
 (5-8) Conveying system;
 (5-9) DADF;
 (5-10) Sorter; and
 (5-11) Editor pad.
(6) Paper tray control system (the embodiment of the present invention):
 (6-1) Paper tray;
 (6-2) Outline of paper tray control system;
 (6-3) Serial communication system;
 (6-4) Intermediate tray control system;
 (6-5) Operational timing of intermediate tray module;
 (6-6) Other paper tray control system and its operational timing; and
 (6-7) Intermediate tray control system.

(1) System configuration of copying machine

Figure 1A:
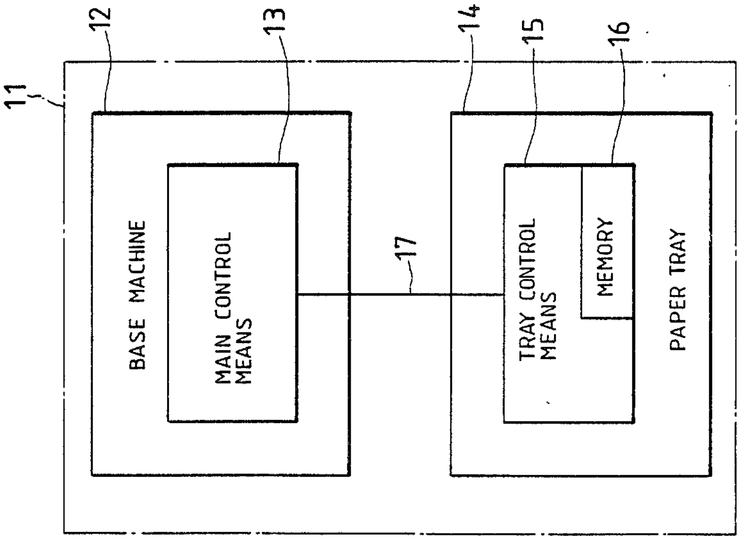
FIGS. 1A and 1B are block diagrams illustrating the principle of the present invention.
Figure 1B:
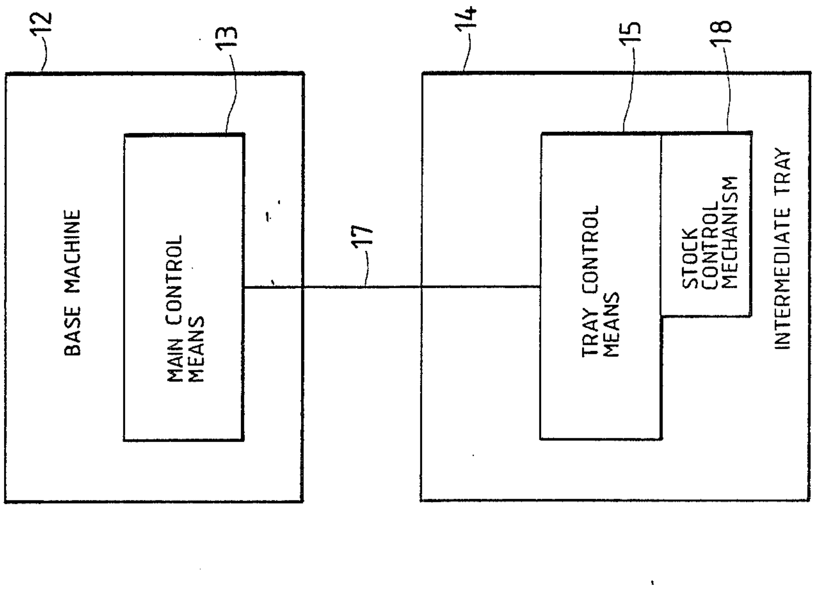
Figure 2:
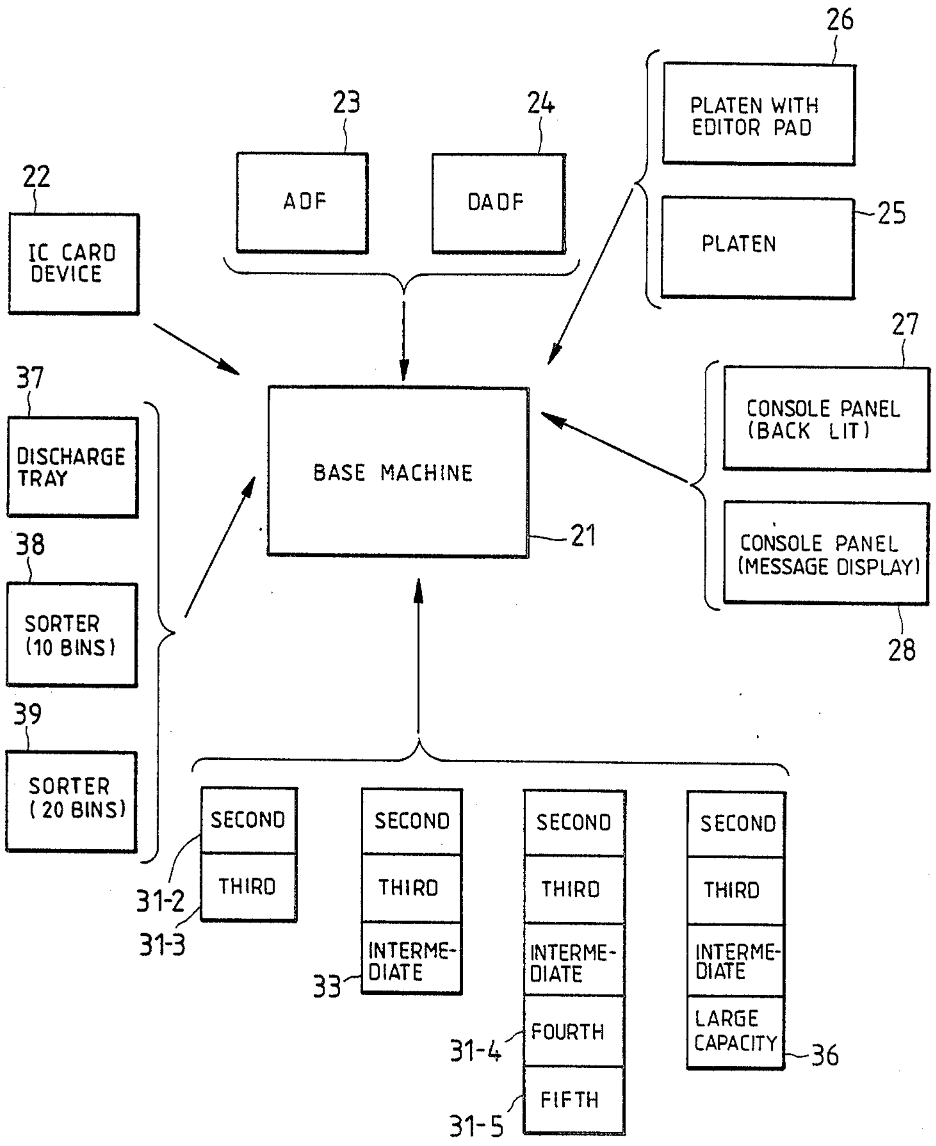

FIG. 2 is a system configuration of a copying machine in the embodiment of the present invention.

As shown in FIG. 2, the copying machine applicable in the present invention is designed so that its function can be upgraded by attaching desired additional devices to a vase machine 21 as the most basic component. The base machine in this case is equipped with a one stage supply tray and a manual feed tray and capable of taking a copy of an original manually set on a platen glass plate. The following additional devices can be attached to the base machine:

(1) IC card device 22;

An IC card device 22 is used to supply necessary data to the base machine 21 using IC cards on one hand and to write data from the base machine 21 to the IC cards on the other. Data (coordinate data) is read by means of an editor pad as will be described later, when the editor pad is connected to the IC card device 22 to carry out the input operation. The IC card device 22 in this embodiment is designed to control the IC card and the editor pad alternately but it is not possible to read data simultaneously using both of them.

The IC card for use in the IC card device in this embodiment has an ISO type interface with a memory capacity of 2 kilo-bytes. The use of IC cards permits not only the storage of complicated data therein but also the automated and multifunctional operation of a copying machine. By providing IC cards classified by industries or customers, for instance, a copying machine operating method agreeable to each group of owners can be implemented even if the copying machine has complicated functions. Accordingly, copying machines becomes quite easy to operate without errors.

(2) ADF 23 and DADF 24;

An ADF 23 is generally called an automatic original feeder and designed to feed originals one after another onto the platen glass plate of the base machine 21 and to discharge the original after completion of development; only one predetermined side of the original is exposed to light. On the other hand, a DADF 24 is of a duplex type, i.e., an automatic original feeder for use in copying both sides of an original.

The DADF 24 operates to convey an original in such a manner that one side of the original faces the platen glass plate to effect a first exposure and then to turn the exposed original upside down before returning it to the tray of DADF 24. As a result, what is opposite to the exposed side is then exposed when the original is fed again. The base machine 21 is arranged so that two sides of copying paper can be used independently for copying while it is equipped with the additional devices as will be described later.

As the ADF 23 and the DADF 24 are usable for the copying machine in this embodiment, copy-making operations can be conducted automatically to copy both sides of originals and copies in combination.

The ADF 23 is basically the same in construction as any of the automatic original feeders heretofore for use in copying machines. In the case of this embodiment, however, originals are inserted left to right facing the apparatus to prevent them from overflowing the base machine 21.

(3) Ordinally platen 25 and platen 26 with editor pad.

An platen 26 with an editor pad is provided with a coordinate input device called an editor pad for editing originals on the platen. An ordinary platen 25 is not equipped with such a mechanism.

(4) Console panel;

There are two kinds of console panels: one 27 which is of a back lit type and the other 28 with a message display. The console panel 27 of the back lit type has a display panel on which messages are arranged in predetermined locations and the massages are selectively lit by a lamp or the like in order to make them readable.

The console panel 28 with a message display adapted in this embodiment is formed with liquid crystal elements whose advantage is that various messages can be displayed anytime within a relatively small area of display. Decision on which one of the console panels should be employed may be made on a copying machine basis in consideration of complication in the system configuration and operability of the copying machine.

(5) Addition of feed tray;

There has already been proposed a typical form of adding a large capacity tray as disclosed in Japanese Patent Application (OPI) No. 77140/82. In this embodiment, however, feed trays in combination which can meet the needs of customers have been adapted. A detailed description has been given of the combination of such feed trays in, e.g., Japanese Utility Model Application (OPI) No. 081016/86 by the present applicants under "Multistage Paper Feed Copying Machine."

(a) Second and third feed trays 31-2 and 31-3.

With the addition of these two feed trays, copying paper of maximum three different sizes can be fed to the base machine 21.

(b) Second and third feed trays 31-2, 31-3 and intermediate tray 33.

An intermediate tray 33 in this case is employed to accommodate copying paper already used for copying temporarily when one side of the paper is used for copying a plurality of times or when both sides thereof is alternately used for copying.

(c) Second and third feed trays 31-2, 31-3, intermediate tray 33, and fourth and fifth feed trays 1-4, 31-5.

(d) Second and third feed trays 31-2, 31-3, intermediate tray 33, and large capacity tray.

A large capacity tray herein described is a feed tray capable of accommodating several thousand sheets of copying paper.

(6) Discharged copying paper receiving device;

Copying paper is normally received by a discharge tray 37. There are provided a 10-bin sorter 38 and a 20-bin sorter 39 in this system. Consequently, copies can be sorted by maximum 10 or 20 distributees if the 10- or 20-bin sorter is set.

As set forth above, the additional devices can be fitted selectively to the base machine 21 in the copying machine system and therefore the most suitable copying machine is offered to the customer. Moreover, the functional upgrading of the copying machine can be attained as business routine on the part of the customer changes.

The purchase of a single unit of base machine 21 may often be fit for customers who do not want to obtain enlarged or contracted copies of originals or a large number of copies at a time. On the other hand, those who need a large number of copies or complicated copy-making operations may often require securing the intermediate tray 33 and the large capacity tray. This coping machine system is designed for each additional device to be simply replaced and detached in order to satisfy such versatile requirements, whereas an independent CPU (Central Processing Unit) is provided for a group of additional device to effect decentralized control by a plurality of CPUs. By this is meant that products for which customers seek become readily available and, in addition to this merit, that the possibility of newly attaching additional devices teach them an innovation in copy-making operations. In view of this, the copying machine system appeals to customers a great deal in that it helps increase the productivity of office business processing.

(2) Software package.

(2-1) Advantage of software combination.

The system configuration of the copying machine as described above can also be detailed by reference to the software combination thereof. More specifically, since various additional device can be fitted to the copying machine, the software is provided so that it conforms to the system configuration corresponding to an arrangement of additional devices.

One of the reasons for the adaption of such software package is (i) that, if control programs for use in operating all of the additional devices are to be provided in the base machine 21, the memory capacity required would become enormous. Another reason is (ii) that, when additional devices are newly developed in a future or when any improvements are made in the existing ones, they can be utilized without the replacement of the ROM (Read Only Memory) in the base machine 21 or the addition of a new one.

Accordingly, there are provided two areas in the base machine 21: a basic storage area for use in controlling the basic part of the copying machine; and an additional storage area where the programs read from IC cards are stored. In the additional storage area, various programs for controlling the ADF 23, the DADF 14, the console panel 28, etc. are stored. When an IC card is set in the IC card device 22 after the predetermined additional devices are fitted to the base machine 21, a program necessary for copy-making operations is read out and loaded on the additional storage device. The program thus loaded is used to control the copy-making operation in cooperation with the program written to the basic storage area of as what is given priority over the other.

(2-2) Example of differentiation.

The program stored in the IC card controls the functions of the copying machine in this embodiment. Accordingly, one mode of operating the copying machine can be differentiated from the other by replacing the card with a new one which stores a different program. A description will subsequently be given of the differentiation by referring to some examples.

As a first example, a copying machine for common use is installed in a building housing a number of independent business institutions or in a company or factory having different departments or sections. The installation of a copying machine for common use in the latter case is required in view of budget control and an instrument such as a copy-riser is normally employed to control service conditions on a department or section basis.

It is also assumed that the copying machine has a relatively high-grade system configuration comprising, as shown in FIG. 2, the base machine 21, the IC card device 22, the DADF 24, the sorter 38, the console panel 28, the second-fifth feed trays 31-2~31-5 and the intermediate tray 33. The joint users or sections include those who need no DADF 24, sorter 38 nor additional devices.

If all the expenses for the use of the copying machine were to be divided among the users or sections whose operational requirements differs with the copying volume, those taking copies of little volume would be very much opposed to introducing a copying machine equipped with various additional devices and this makes it extremely difficult to mediate between the high- and low-degree users or sections.

Such a problem can be solved by allotting an IC card to each user or section according to the operation rate so as to let the users or sections wishing high-grade functions bear greater basic expenses in proportion to the operation rate. In this manner, many functions can be utilized. The owner of the highest grade IC cards, for instance, is allowed to freely use the DADF 24, the sorter 38, the second-fifth feed trays 31-2, 31-5 and the intermediate tray 33 by operating the copying machine while the IC card is set in the IC card device 22 to ensure the improved efficiency business. On the other hand, the user who does not want to have copying paper sorted can save the expenses by setting an IC card lacking a sorting program and employing the uppermost bin of the sorter 38 as a discharge tray.

As a second example, assuming that a trader is running a self-copy service store using IC cards.

There are a plurality of copying machines disposed in the store, the copying machines being equipped with IC card devices, respectively. Each customer asks for an IC card corresponding to the desired mode of service, so that he can take copies on a self-service basis by setting the IC card in the desired copying machine. The customer who is unfamiliar with the operation of copying machine may be given an IC card incorporating an operational instruction display function in the program and, by setting the IC card, can take copies errorlessly according to the operational data displayed on the console panel 28. Whether or not the use of the DADF 24 or the execution of multicolor recording is possible can be determined by a lend-lease IC card, whereas the storekeeper is capable of assigning a copying machine at a proper rate to a particular customer by limiting the copying machines for use. Moreover, the storekeeper is also able to take careful thought-out measures such as offering copying-fee discount service to regular visitors because he can instantly charge the fee therefor by writing copy-making data to the IC card, the data including the number of sheets, the size of copying paper used and so on.

As a third example, a description refers to service using an IC card storing a program intended for a specific user. In patent attorneys' offices, copies of relatively large magnification, e.g., 200% enlarged copies are often taken because of the necessity for making full-scale copies when patent gazettes contracted by the photomechanical process are examined. Moreover, the original drawings will have to be contracted or enlarged fractionally as requested by the government agency when they are submitted thereto. In the resident-card copy-making sections of municipal offices or ward offices, on the other hand, certified copies or abstracts of the originals are prepared with the deletion of image data in columns thereof where the data should be treated in confidence so as to protect the data of persons other than those claimed and their privacy.

In that manner, some users may demand to use copying machines in the special modes of use. If the functions of copying machines are set to meet such requirements, their console panels will become complicated in construction and moreover the ROMs inside the copying machines also become large in size. Consequently, IC cards classified by special users are used to provide copying machines having functions most suitable for such users by letting them set the IC card therein.

In the case of patent attorneys offices, for instance, the purchase of IC cards for special use allows them to simply select 200% contraction/magnification in addition to several ordinary kinds of contraction/magnification as fixed ones. It also becomes possible for them to set a contraction/magnification ratio adjustable over, e.g., 1% within the range of fine adjustments required. In the aforesaid resident-card copy-making sections, instructions concerning kinds of resident cards columns and items to be deleted, etc. can be given on liquid crystal displays by pressing keys such as ten keys and, by pressing the start key, the desired range of the original may be copied or the necessary contents thereof are edited before being recorded.

(3) Example of the construction of copying machine

Figure 3:
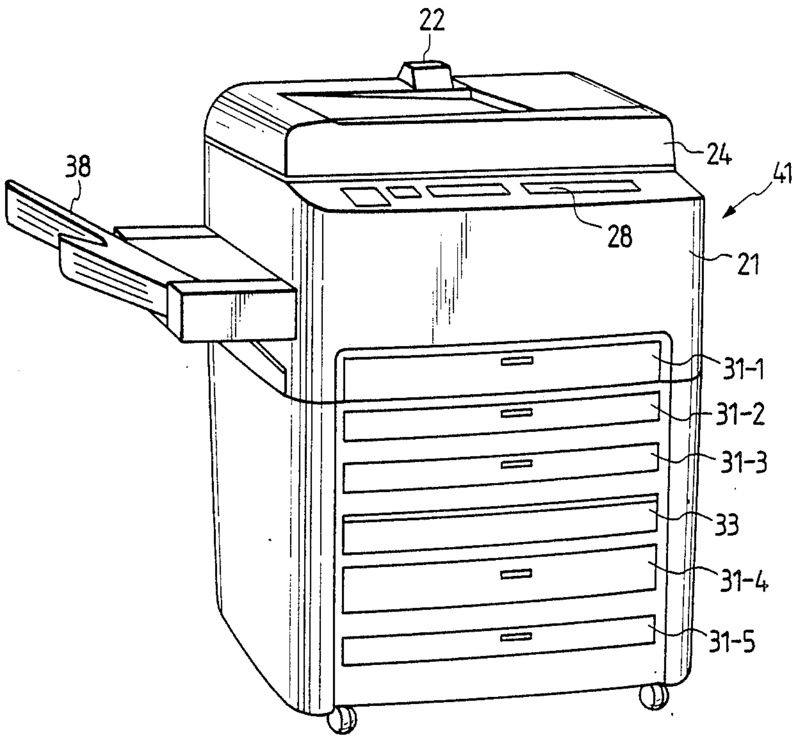

FIG. 3 is an external view illustrating an example of the system configuration of the copying machine in the aforesaid embodiment.

In the copying machine in this embodiment, the DADF 24 is installed on the base machine 21 and the IC card device 22 is disposed on the rear surface thereof. The control panel 28 with a message display is laid on this side surface of the base machine 21. A manual insert tray 41 (not shown) is fitted to the right side of the copying machine and the 10-bin sorter 38 to the left side thereof. The manual insert tray 41 is used for manual feeding and a plurality of sheets of paper can be simultaneously set before being fed successively.

As set forth above, the base machine 21 is fitted with the first feed tray 31-1 as a basic component. In this copying machine, the second and third feed trays 31-2, 31-3 are disposed under the first one, whereas the fourth and fifth feed trays 31-4, 31-5 are arranged with the intermediate tray 33 sandwiched therebetween. All of these feed trays 31-1~31-4 and the intermediate tray 33 can be slid out to this side, so that not only the improvement of operability but also economy of space for the installation of the copying machine is accomplished. Moreover, this copying machine is neat and streamlined in design without the protrusion of the ADF (Automatic Draft Feeder) and the paper feed trays.

Figure 4:
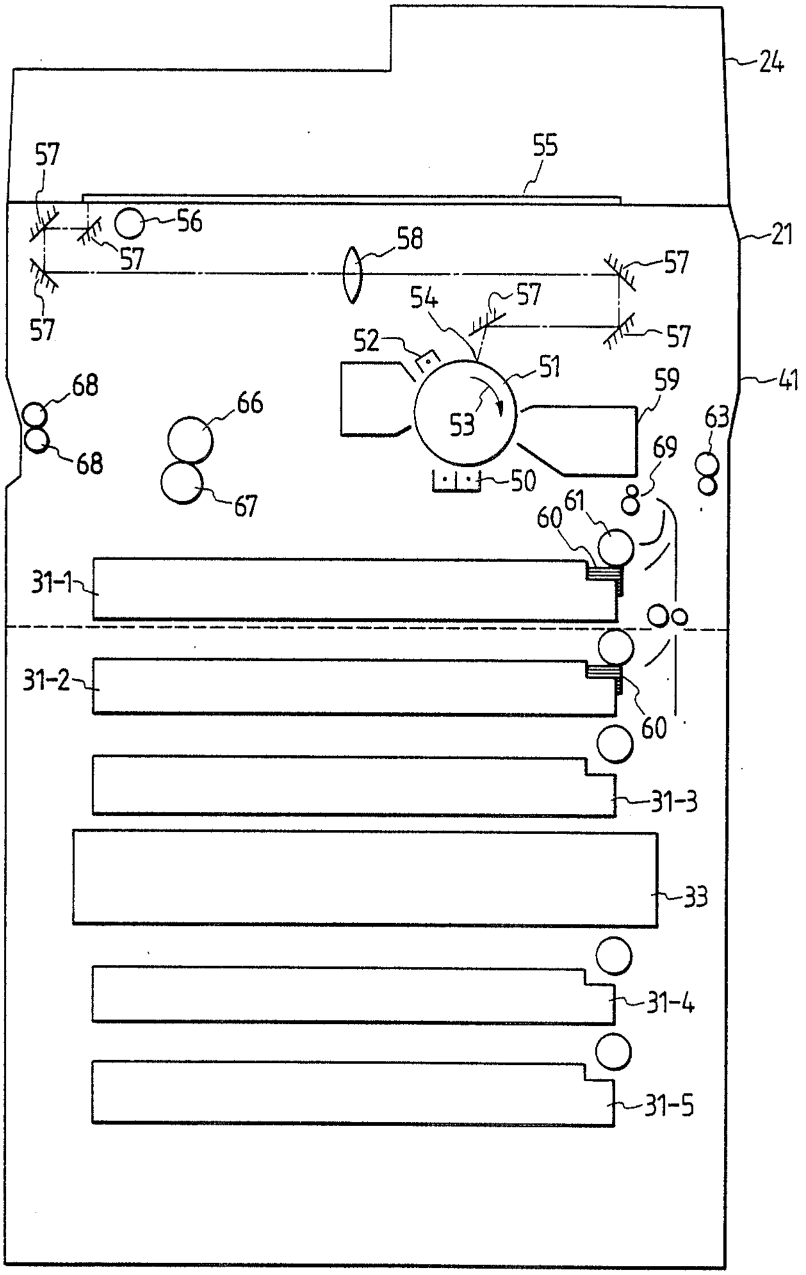

FIG. 4 is a schematic view of the copying machine, wherein a photoreceptor drum 51 is contained in the base machine 21. The photoreceptor drum 51 is uniformly charged by a charge corotron (charger) 52 and turned at a fixed speed in direction of arrow 53, the charged surface thereof is exposed to light in an exposure range 54. Optical images of an original (not shown) placed on a platen glass plate 55 disposed on the base machine 21 are incident on the exposure range 54. For this purpose, an arrangement is made of an exposure lamp 56, a plurality of mirrors 57 for transmitting the light reflected from the surface of the original illuminated thereby and an optical lens 58. Some of them as prearranged are scanned for the purpose of reading the original.

Electrostatic latent images corresponding to the original ~~are~~ form~~ed~~ on the phtoreceptor drum 51 by the image data exposed in the form of slits in the exposure range 54. The electrostatic latent image is developed by a developing device 59 and converted to a toner image. The toner image moves as the photoreceptor drum 51 turns and passes by a transfer corotron (transfer device) 50.

On the other hand, copying paper 60 contained on the first feed tray 31-1 fitted to the base machine 21 or manually fed along the manual insert tray 41 is sent out by a feed roll 61 or rolls 63 and guided by conveyer rolls 69 before bing passed between the photoreceptor drum 51 and the transfer corotron 50. The toner images are transferred onto the copying paper 60 at this time. The copying paper 60 after the transfer is passed between a heat roll 66 and a pressure roll 67 and then subjected to heat fixing. Subsequently, the copying paper 60 is passed between conveyer rolls 68 and discharged onto a discharge tray (not shown).

The DADF 24 is fitted to the base machine 21 in this embodiment. Both sides of the original can thus be placed successively on the platen glass plate 55. In this case, one side of each of the originals piled up in the original container of the DADF 24 is first set on the surface of the platen glass plate 55 and, at the point of time a copy is taken, the original is turned upside down and reset in the container. The original is then sent to the platen glass plate 55 again.

Although five trays 31-2~31-5, 33 have been installed under the base machine 21, simply a cabinet may be arranged instead so as to accommodate expendables. Moreover, the copying machine with the base machine 21 left intact may be mounted on a desk and used as a desk-top copying machine. Needless to say, only the second feed tray 31-2 may be installed under the first feed tray 31-1, so that the copying machine with this arrangement is mounted likewise on a desk.

Figure 5:
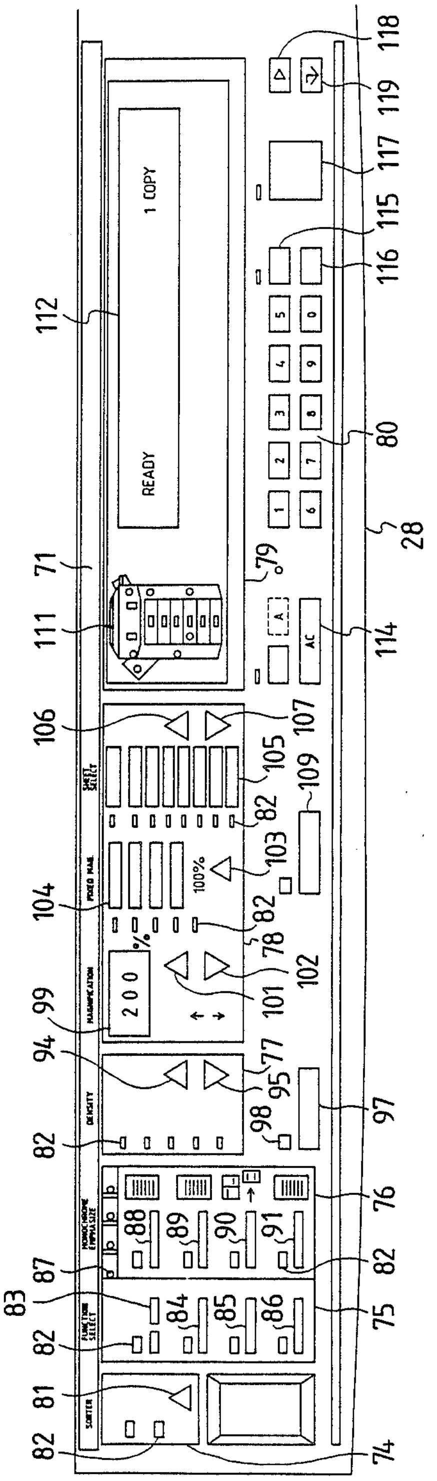

FIG. 5 is a top view of a console panel of the copying machine. The details of the art of display control as described hereinafter by the present applicants have been disclosed in Japanese Utility Model Application No. 130320/86 under the title of "Display Unit" and Japanese Utility Model Application No. 066170/86 under "Character Display Unit". Japanese Utility Model Application No. 130320/87, for instance, discloses the prevision of a graphic display area through-a dot pattern in a copying machine, suggesting the use of the graphic display area in order to make various kinds of display. In a copying machine capable of copying part of an original, moving and deleting a picture, for instance, an image sensor reads an image in the area intended while the original is placed on the platen with the suggestion of displaying its contour in the graphic display area, whereby not only errors in area setting but also misoperation are prevented from occurring.

A plurality of console panels may be adopted. However, the console panel 28 with a message display is employed in the copying machine in the above-described embodiment.

A menu display plate 71 is arranged above the console panel 28 are the contents of the respective panel sections 74–79 are displayed with characters. A switch 81 and two display lamps 82 are disposed in the panel section 74 for the senter among them so that the sorting mode may be selected when the sorter is connected. The sorting mode consists of a stack mode in which sheets of copying paper are successively stacked and a gathering mode in which they are sorted in bins.

A switch 83 (i) for editing or correcting/identifying images; a switch 84 (ii) for having images stored in a job memory; a switch 85 (iii) for implementing various copying forms; a switch (iv) for taking duplex copies; and display lamps 82 for displaying whether or not these switches have been selected are disposed in the function selecting panel sections 75. By the editing (i) is meant the function or reading data for editing by means of the editor, whereas the correcting/identifying means the function of displaying the input data in a liquid crystal display for identifying and replacing the data. The memory used in (ii) is a nonvolatile memory composed of a random access memory backed up by a battery. Other storage media such as an IC card, a magnetic card, a floppy disk, etc. are needless to say usable as a nonvolatile memory. Image density and magnification can be preset in this copying machine in order to reduce the operating load of the console panel 28 by the operator and the values thus preset are stored in the nonvolatile memory. When the switch 85 is pressed (iii), character data is displayed in the display panel section 79 of the console panel 28 and the desired function among "the other" ones can be selected.

The other functions in that case include (i) a continuous page copying function, (ii) a side canceling function and (iii) a binding-margin function. The continuous page copying function (i) among them is that of dividing an original extending over two pages like a book-binding original into two one-page sections while it is in the state of a double-spread page. The side canceling function (ii) is that of copying no image data on the periphery of the original so that the original looks as if it were surrounded with a "frame" on the periphery of the image data. The binding-margin function (iii) is such that a "binding margin" is set in the right-hand or left-hand side portion of a copy. The binding margin having a desired length can be set and its value may be key boarded 80 at the console or selected from the values displayed then on the display panel 79.

(iv) Finally, the duplex copy means taking copies on both sides of copying paper, respectively. When the duplex copy is made, the copying paper 60 with the first one side used for copying is delivered onto the intermediate tray 33 shown in FIG. 4. Subsequently, the copying paper 60 is again sent out of the intermediate tray 33 and the other side thereof is used for copying. For monochromatic copying by means of this copying machining as will subsequently be described, the one side thereof is used twice for copying. In this case, it has been so contrived that the inside and outside of the copying paper being accommodated on the intermediate tray 33 are turned upside down.

On the menu display plate 71 shown in FIG. 5 are four display lamps 87 disposed in the uppermost portion of the monochrome emphasizing panel section 76 under the portion where "Emphasizing Monochrome" is displayed and used to indicate kinds of color developing agents (color). The lamp(s) corresponding to the color(s) presently set is lit because one or a plurality of color (out of four colors, e.g., red, blue, etc.) developing agents can be set in this copying machine.

Four switches 88–91 and display lamps 82 for displaying which one of the switches 88–91 has been set are disposed in the remaining portion of the monochrome emphasizing panel section 76. The color marking switch 88 among them is (i) used for marking color. If this switch is pressed to specify the area where marking is made, that area is recorded with a light color superposed thereon, for instance, and the intended effect of marking is produced.

The continuous color dualizing switch 90 (ii) is used to record one color in the specified area of a copy. A figure to be displayed with color is placed on the, e.g., right-hand side of the platen glass plate 55 (see FIG. 4), whereas an original is set on the left-hand side thereof. When a copy is made in the aforesaid condition, the image data of the original is copied in black and the figure is drawn thereon in one color. If the figure specified is formed of dots, the colored sigure adjusted to the desired density by the reproduction of the dots is then recorded in the specified area of copying paper. In addition, the names or designs of merchandise are set on one side of the platen glass plate 55, whereas offering prices written on paper are arranged on the other, so that the standing prices thereof are readily displayed as one pattern of-copy-making operation.

When the partial color conversion switch 89 is selected (iii), only the specified area is copied in one color and the remaining portion is copied in black. On the other hand, the original is copied in one color when the monochromatic switch 91 is selected (iv).

In the copy density panel section 77 provided under the portion where "Copy Density" is displayed on the menu display plate 71 are display lamps 83 indicating which one of the five stage copy densities has been selected and shift keys 94, 95 for selecting one of the copy densities. The upper shift key 94, when pressed, is used to decrease the copy density, whereas the lower shift key 95 is used to increase the copy density. The copy density can be adjusted by changing the developing bias of the developing device 59 shown in FIG. 4; changing the quantity of light from the exposure lamp 56 (FIG. 4); and changing the quantity of charge given by the charge corotron 52 relative to the photoreceptor drum 51. In this embodiment, the developing bias can be adjusted to, e.g., 16 stages.

An automatic density adjusting switch 97 is arranged under the copy density panel section 77. When the automatic density adjusting switch 97 is pressed, an automatic density display lamp 98 is lit to provide an automatic density adjusting mode. In the automatic density adjusting mode, part of the light reflected from the original when the original is scanned and arriving at the photoreceptor drum 51 is taken by the half mirror and the potential of the developing electrode within the developing device 59 is set, depending on the proportional quantity of that part of light.

In the magnification paper selection panel section 78 provided under "Optional Magnification" on the menu display plate 71 are a display section for setting the magnification desired on the left-hand side thereof and a paper selecting section on the right-hand side thereof.

A magnification table display 99 is provided in the section where magnification is set and displayed. In this copying machine, 50-to-200% magnifications can be set optionally at a rate of a 1% point (linear magnifications) and the magnification thus set is displayed in the magnification table display 99. The magnification display is set by either operating shift keys 101, 102 optionally or selecting the predetermined fixed magnification.

When the optional magnification is set, the shift keys 101, 102 are operated. The upper shift key 101, when pressed, is used to increase the magnification by 1%, whereas the lower shift key 102 is used to decrease the magnification by 1%. While the shift keys 101, 102 are kept being pressed, the magnification increases continuously at a rate of 1%.

The selection of the fixed magnification is made by a fixed magnification key 103. The fixed magnification is displayed on a magnification display plate 104 and, in this embodiment, can be selected from among 141.4%, 86.5%, 81.6 and 70.7%. In addition, 100% as an equimultiple may be selected. Which one of the magnifications has been selected is made known by display lamps 82 disposed next on the left-hand side of the display plate 104.

In the copying paper selecting section above are eight display plates 105 for displaying paper sizes and shift keys 106, 107 for selecting one of the sizes. Display lamps 82 are disposed next to the eight kinds of display plates 105, the lamps 82 being used to display which one of the copying papers or sizes has been selected. The following are displayed in the display plate 105 in this embodiment:

(i) Display of manual insert tray;

When the manual insert tray 41 (FIG. 4) is used, this display is selected. A conventional manual insert tray is designed to feed a sheet of copying paper at a time and it is only necessary for the operator to feed the copying paper with priority given to the manual insert tray, whereas the operator need not select the manual insert tray itself. On the other hand, a plurality of sheets of copying paper can simultaneously be set on the manual insert tray 41 in this embodiment. If copying paper is set by having the manual insert tray 41 convey the paper, the plurality of sheets of copying paper may start being fed at the point of time they are being set. In order to avoid the situation above, the selection of the manual insert tray 41 is displayed.

(ii) A3 paper display;

This display is selected when copying paper of A3 size is used in the longitudinal direction.

(iii) B4 paper display;

This display is selected then copying paper of B4 size is used in the longitudinal direction.

(iv) A4 paper display;

This display is selected when copying paper of A4 size is used in the longitudinal direction.

(v) B4 paper display;

This display is selected when copying paper of B5 sizes used in the longitudinal direction.

(vi) A4 crosswise paper display;

This display is selected when copying paper of A4 size is used in the direction perpendicular to its longitudinal direction.

(vii) B5 crosswise paper display;

This display is selected when copying paper of B5 size is used in the direction perpendicular to its longitudinal direction.

(viii) Nonstandard paper display;

This display is selected when nonstandard paper is used.

An automatic paper/magnification selecting switch 109 is arranged under the magnification paper selection switch 78. When this switch 109 is pressed, the automatic/magnification selecting switch 109 is selected and a combination of preset magnification and paper size is selected. The operator can thus learn whether or not the desired combination has been selected from the display lamp 82 lit in the magnification paper selection panel section 78. In case the desired combination has not been attained, it is possible to change the combination by again pressing the automatic paper/magnification selecting switch 109.

The display panel section 79 is arranged to the right of the magnification paper selection panel section 78. A pattern display 111 and a liquid crystal display 112 of the copying machine are arranged in the display panel section 79. The pattern display 111 is used to display by means of lamps lit the feed tray selected and a location where jamming has occurred. A sentence including Chinese characters can be displayed on the liquid crystal display 112 of this embodiment. In the example shown in FIG. 5, the copying machine is ready for operation with one set copy. The liquid crystal display 112 of this embodiment is a color liquid, crystal display which is able to indicate the specified areas with colors, respectively.

The following keys or buttons are disposed under the display panel section 79:

(i) All clear button 114;

This button is used to restore the basic state, i.e., to return the operational mode of the copying machine to the priority one initially set wherein copying paper is selected.

(ii) Ten keys 80;

These keys are used to set the number of sheets of copying paper, input numerical values for specifying the contents of diagnosis when the copying machine is diagnosed.

(iii) Interruption button 115;

This button is used in case of emergency where some other copies must be taken while continuous copy-making operations are performed. It is also used to release the interruption in order to restore the original copy-making operations as soon as the interruption process is terminated.

(iv) Stop-clear buttons 116;

This button is used as a clear button to stop unfinished copy-making operations and to set the number of copies and the bin of the sorter.

(v) Start button 117;

This button is used to start copy-making operations.

(vi) Selection key 118;

This key is used to move a cursor in response to the message displayed, i.e., as a cursor key.

(vii) Set key 119;

This key is used (as a return key) to locate the setting at the place specified by the cursor.

As set forth above, the basic operational area and the applicative operational area on the console panel in this embodiment are completely separated from each other; e.g., the selection of copying paper and copy density setting are carried out in the former, whereas the selection of functions and emphasis on monochromatic color are effected in the latter. In addition, errors in panel operation are minimized by giving assistance to the applicative operation by displaying Chinese characters including kana on the liquid crystal display 112.

(4) Circuit configuration of copying machine.

Figure 6:
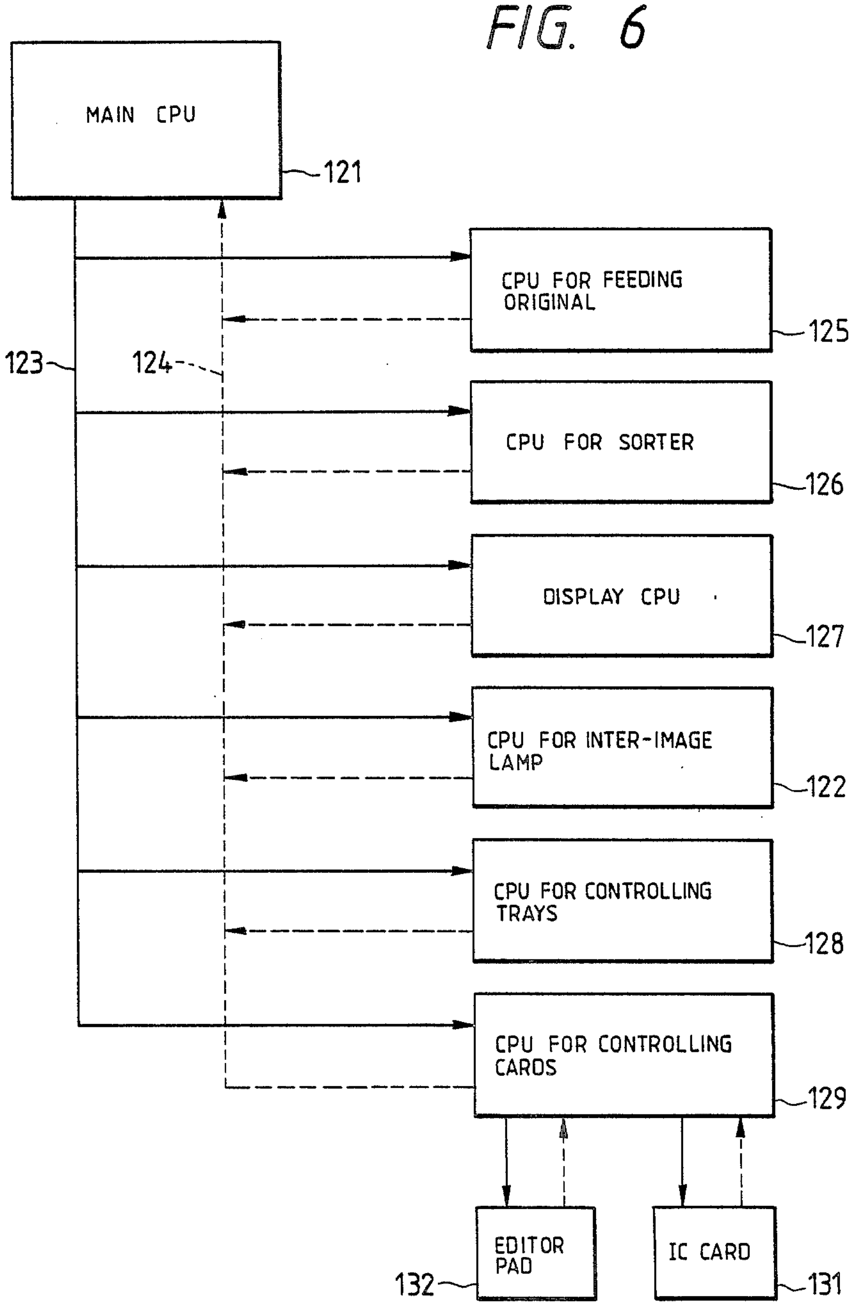

FIG. 6 is a schematic circuit configuration of the copying machine (FIG. 2).

In FIG. 6, there is shown a decentralized CPU architecture for serial communication centering around a CPU 121 so as to make possible not only the optimum arrangement of a controller but also the provision of optimum cost performance. In view of the development of products such as copying machines, it is anticipated to shorten a period of developing software in the form of modules in design to improve the efficiency thereof, whereby it is ensured to simplify their wire furnaces, reduce production costs and to facilitate troubleshooting.

Since processing efficiency is increased by the decentralization of processing using a plurality of CPUs, programs prepared to the satisfaction of complicated high-speed processing can be provided using inexpensive 8-bit CPUs but not expensive 16-bit CPUs.

Moreover, the decentralization of processing facilitates the diffusion of models. In other words, even when new input/output devices are developed, the modification of programs on the part of the main CPU may become unnecessary, so that the alteration thereof is minimized.

With respect of the printed circuit boards on the main CPU side, the decentralization of the CPUs makes it unnecessary to store needless I/O ports and programs. Accordingly, it becomes possible to reduce the cost of the printed circuit board to ensure a free equipment layout.

The base machine 21 in this copying machine is controlled by a main CPU (Central Processing Unit) 121 and a CPU 122 for an inter-image lamp within the base machine 21. The CPU 122 for an inter-image lamp in this case specializes in controlling the inter-image lamp.

The inter-image lamp is used to throw light on the photoreceptor drum 51 after exposure and to erase par of an electrostatic latent image before development. When an original of B5 size is copied equimultiplicably in the prior art, for instance, the area other than the B5 size on the photoreceptor drum 51 is illuminated so as to prevent a toner image from uselessly forming outside the area. The copying machine in this embodiment is, as will be described later, provided with the function of editing image too. When the formation of an electrostatic latent image may be restricted to a predetermined rectangular area or polygonal one, the partial deletion of the electrostatic latent image accordingly becomes needed to effect the aforesaid processing. In this case, a CPU independent of the main CPU 121 in the copying machine in this embodiment is employed because the inter image lamp is being used to an extent greater than that in the prior art.

Xerox Co. is one of the manufacturers that has introduced such a decentralized processing system as what is employed to control a copying machine and Japanese Patent Application (OPI) No. 78371/59 by Xerox Co. discloses the detailed contents of the art and relevant references in "Copying Machine Control Apparatus and Method of the Same."

The communication method adopted in the present invention is not the "Ether Network"" intended for high-speed processing employed in the aforesaid Patent Application but equivalent to what is capable of obtaining the same effect with a 4,800 Baud current loop.

In the meantime, the present applicaants have given a detailed description of the CPU 122 for an inter-image lamp in Japanese Utility Model Application No. 152591/86 entitle "Image Copying Machine" and Japanese Patent Application No. 023392/87 entitled "Image Erasing Device for Copying Machine."

In this embodiment, the copying machine is equipped with the following CPUs and connected with communication lines 123, 124. The main CPU 121 assumes the role of generalizing those CPUs and the CPU 122 for an inter-image lamp.

(i) CPU 125 for feeding original;

A CPU 125 for feeding originals controls the DADF 24 shown in FIG. 4. When the ADF 23 (FIG. 2) in place of the DADF 24 is used, the CPU contained therein is connected to the communication lines 123, 124.

(ii) CPU 126 for a sorter;

A CPU 126 is arranged in the 10-bin sorter 38. Another CPU is also installed for special use in the 20-bin sorter 39. The main CPU 121 finds out which one of the sorters 38, 39 has been connected and controls sorting correspondingly.

(iii) Display CPU 127;

A display CPU 127 127 is used to display various kinds of data with kanjis on the aforesaid display 112 fitted to the console panel 28 and an area for editing purposes. No special CPU is used when the console panel 27 of a back lit type (FIG. 2) is employed because complicated display control is unnecessary. If the liquid crystal display 112 is employed, the ten keys are used to designate figures being edited.

(iv) CPU 128 for controlling trays;

A CPU 128 for controlling trays is used to control the fourth and fifth trays 31-4, 31-5 among those newly added to the base machine 21, the large capacity tray and the intermediate tray 33. This CPU is located behind the tray cabinet containing each of the trays and controls them, depending on the tray thus connected. Among these trays, the intermediate tray 33 is equipped with its own motor for conveying copying paper and further the location of the copying paper placed on each tray differs with its size. Accordingly, the CPU needs to effect complicated control.

The mode of controlling each tray by the CPU 128 for controlling trays is as follows:

(i) Control of both or one of the fourth and fifth feed trays 31-4, 31-5 and the intermediate tray 33;

(ii) Control of the large capacity tray and the intermediate tray;

(iii) Control of only the intermediate tray 33;

(iv) Control of both or one of the fourth and fifth feed tray 31-4, 31-5;

(v) Control of only the large capacity tray; and (vi) CPU 129 for controlling cards.

The CPU 129 controls IC cards 131 used to store additional data for use in adding or correcting the functions of the copying machine in order that the data is read. When the IC card 131 is used to designate the coordinates of an original, further, the CPU 129 controls the reading/writing operation of the card 131. Moreover, the CPU 129 can also control an editor pad 132, though this operation is not employed in this embodiment. The editor pad 132 is used to input coordinates and will be described in detail later.

Figure 7:
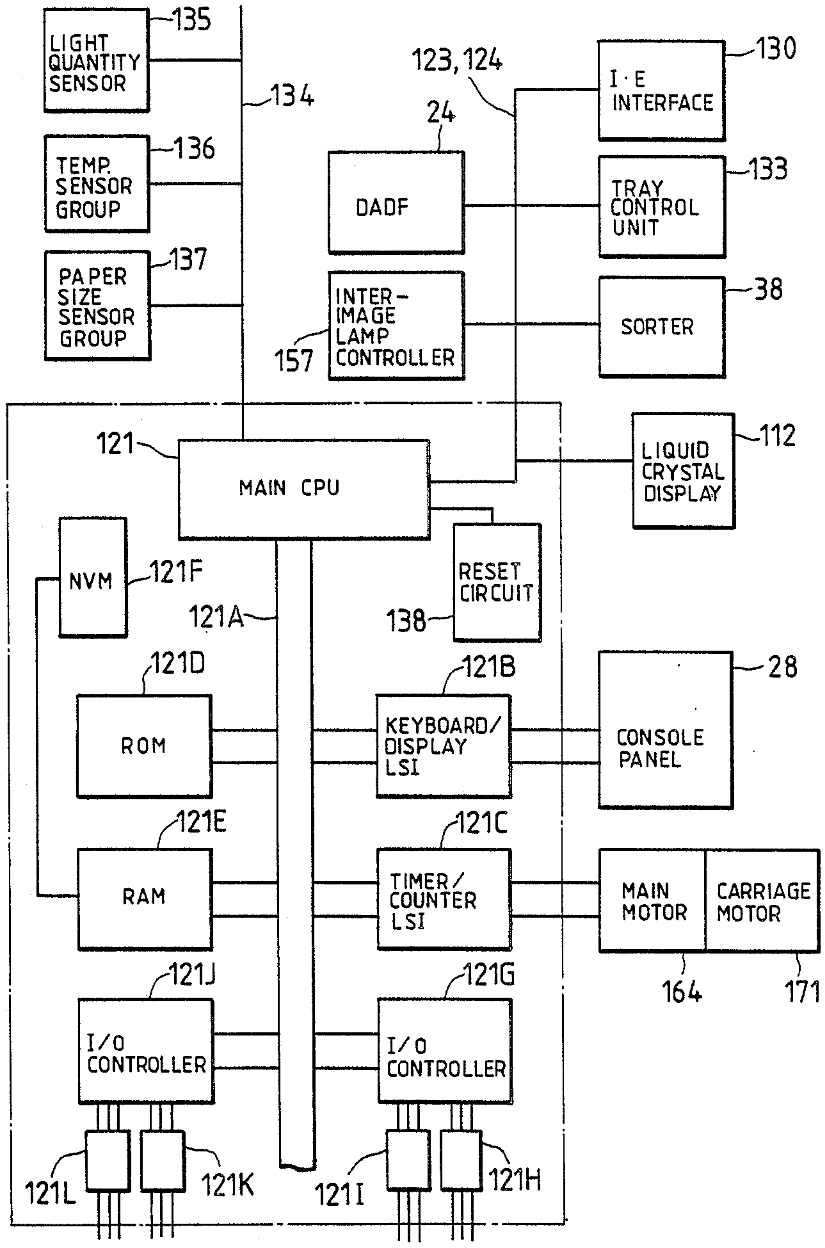

FIG. 7 is a detailed circuit configuration with the main CPU as a central figure acting the pivotal role in the copying machine of this embodiment.

Copying machines controlled by control apparatus such as CPUs and microcomputers have already been made known by a paper "A Programmable Digital Control System for Copying Machines" by Sikandar Sheikh of Xerox Co., IEEE Trans, Com, Vol IECI-21, No. 1, Feb. 1974 and Japanese Patent Application (OPI) No. 62644/75 "Electrophotographic Copying Process and Apparatus" as the first instance of a similar idea. Like the main CPU, other CPU modules are, needless to say, composed of one-chip CPUs, ROMs, RAMs, I/O, etc.

(i) The main CPU 121 is, as partially described in FIG. 6, connected via the communication lines 123, 124 to the following component parts:

(1) DADF 24.

(2) Sorter 38.

(3) Liquid crystal display 112.

(4) IC card editor pad interface 130; an interference which is arranged in the IC card device 22 and causes data to be given to and received by the main CPU 121 when an IC card and an editor pad 132 are connected to the copying machine proper.

(5) Inter-image lamp controller 157.

(6) Control unit for controlling the fourth and fifth trays 31-4, 31-5, the intermediate tray 33, etc.

(ii) The main CPU 121 incorporates an A/D converter and is connected via an analog data line 134 to the following parts. There are 8-bit one-chip CPUs, e.g., μPD7810CW, μPD7811CW of Nippon Electric Co. and MB89713X of Fujitsu, Ltd.

(1) Light quantity sensor 135; used to detect the quantity of light derived from the exposure lamp 56 (FIG. 4) and control it.

(2) Group of temperature sensors 136; soft touch sensors for controlling fixing temperatures as will be descried later.

(3) Group of paper size sensors 137; sensors for detecting the sizes of paper placed on the feed tray 31. Copying paper can be fed from maximum five kinds of trays according to the system configuration of the copying machine in this embodiment. Consequently, if four sensors for detecting the paper size are disposed on one feed tray, with digital data being used for processing purposes, 4-bit digital data will have to be sent to the main CPU 121 from one tray. This will also necessitate maximum 20 input ports in total, together with a number of connectors and cables constituting a harness;

this construction is not preferable in view of not only cost and size reduction but also reliability.

In this embodiment, accordingly, the conditions specified by four sensors per tray of the copying machine are sent out as analog data. The analog data received by the main CPU 121 is converted into digital data therein, so that the maximum 16 sizes of copying paper put on each tray are identified.

(iii) Further, the main CPU 121 is reset at the time of the runaway or initialization of the reset circuit and also connected via a bus line 121*a* to the following parts.

(1) Keyboard/display LSI 121B; circuit for interceding with the console panel 28 for the data.

(2) Timer/counter LSI 121C; a circuit for controlling the driving of a main motor 164 and a carriage motor 171.

(3) ROM 121D; a Read Only Memory having a capacity of 56 K bytes and storing the basic control data of the copying machine.

(4) RAM 121E; a Radom Access Memory having a capacity of 6 K bytes and temporarily strong data. The aforesaid nonvolatile memory (NVM) 121F if connected to this RAM 121E and capable of preserving the necessary data even when the power supply of the copying machine is cut off.

The necessary data stored in the nonvolatile memory (NVM) 121F includes (a) a setup value for use in regulating the registration of copying paper, (b) the quantity of erasing the tip portion of an image by the inter-image lamp as will be described later in detail, (c) a fine adjusting value for use in adjusting the vertical and horizontal magnifications when the equimultiple copying value is set, (d) each parameter adjusting value for use in adjusting the parameter on the copying machine production line such as the quantity of a binding margin when a copy is taken with a blank for providing the binding margin, and (e) data for use in detecting the operating condition of the copying machine such as the actual value resulting from the use of the feed counter on each feed tray 31. Moreover (f), a table of function data conversions between copying machines may be written to the nonvolatile memory, depending on the apparatus. In this case, the advantage is that the conversion table can be rewritten as occasion demands, using external data stored in IC cards.

(v) First I/O controller 121C; an input/output controller for reading various data via a filter circuit 121H and driving various parts via a driver circuit 121I. Switches and sensors are connected to the filter circuit 121H and solenoids such as developing solenoids and clutches 233 contained in the feed trays 31-1~31-5 are also connected thereto as will be described later.

(vi) Second I/O controller 121J; an input/output controller for reading various data via a filter circuit 121K and driving various parts via a driver circuit 121L. Switches and sensors are connected to the filter circuit 121K. The driver circuit 121L is equipped with a know D/A (Digital-Analog) converter and a PWM (Pulse Width Modulator) and used to set the developing bias of a developing device and the current value of the charge corotron 52 as the program is processed, which will also be described later.

(5) Detailed circuit configuration of copying machine.

Referring to FIGS. 8~13, a detailed description will be given of the circuit configuration of the copying machine in this embodiment.

(5-1) Periphery of photoreceptor drum.

Figure 8:
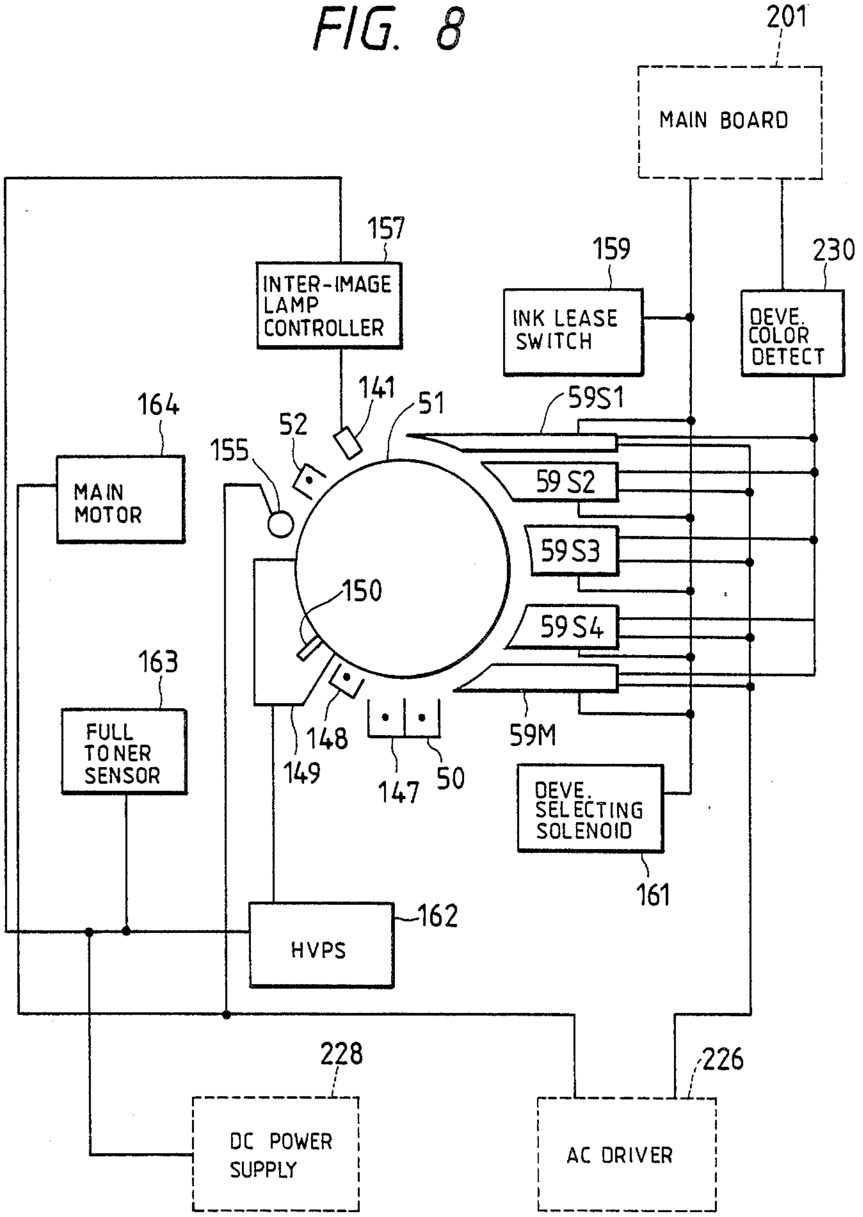

FIG. 8 is a block diagram illustrating the periphery of the photoreceptor drum 51.

On the periphery of the photoreceptor drum 51 are a charge corotron 52, an inter-image lamp 141, four kinds of sub-developing devices 59S1–59S4, a main developing device 59M, a transfer corotron 50, a detack corotron 147, a pre-clean corotron 148, a cleaning device 149 and a deelectrifying erase lamp 155 in this order. The first, second, third and fourth sub-developing devices 59S1, 59S2, 59S3, 59S4 use red, blue, green and light brown toner for developing, respectively.

The inter-image lamp 141 consists of a train of 128 light-emitting diodes disposed in a row and a plastic lens arranged in parallel with and in front of these diodes. The plastic lens (not shown) having a nonspherical convex surface in a position corresponding to each light-emitting diode is arranged so that, even when the light-emitting diodes adjacent to each other emit light, the intensity of the light on the photosensitizer drum 51 will not become uneven in the boundary therebetween. Moreover, the focal point of the plastic lens is made to shade off on the photoreceptor drum 51. Accordingly, when a triangular figure is processed (e.g., extracted or deleted), for instance, the difference in stage between the light-emitting diodes as a unit is considerably decreased in the boundary being processed.

An inter-image controller 157 is designed to control the on/off of the light-emitting diodes as 128 segments of the inter-image lamp 141. The cleaning device 149 is provided with a doctor blade 150 and used to peel the toner deelectrified by the pre-clean corotron 148 off the photosensitizer drum 51.

In the copying machine in this embodiment, a main motor 164 is started 0.2 second later than the contact of the doctor blade with the photoreceptor drum 51. Moreover, the doctor blade 150 is not separated from the photoreceptor drum 51 immediately after the main motor 164 stops but separated therefrom five seconds later; thereby the toner is prevented from contaminating the interior of the copying machine by scattering because of the vacuum suction strength.

The sub-developing devices 59S1–59S4 each are equipped with the following parts:

(i) Color sensor;

A color sensor for identifying which one of the color developing agents has been set in each of sub-developing devices 59S1–59S4. Even if the sub-developing devices 59S are installed with the combination of red, blue, green and light brown colors, the color sensors can be used to detect the respective colors provided for the sub-developing devices 59S1–59S4. Each detection output is sent to a developing color detecting circuit 230 and transmitted to a main board 201.

(ii) Toner sensor;

A toner sensor for determining whether the supply of toner is needed.

(iii) Dispense motor;

A motor for churning the toner contained in a toner box and supplying it.

A main developing device 59M uses black toner for developing and has a toner sensor and the dispense motor. An ink lease switch 159, if pressed by the operator, is used to increase the quantity of toner. While one of the sub-developing devices 59S1–59S4 is selected, the ink lease switch 159, if pressed, operates to increase the quantity of toner being suppled to the sub-developing device involved. If the switch is pressed while the main developing device 59M is selected, the quantity of black toner is increased.

A developing device selecting solenoid 161 is used to selectively switch the five developing devices, namely, the main developing device 59M and the sub-developing devices 59S1–59S4. The switching operation will be described anew in the subsequent paragraph.

A high-voltage power supply (HVPS) 162 is used to form a parallel electric field in the main and sub-developing devices 59M, 59S1–59S4 so as to improve the reproducibility of the solid portion (solid black one). A full toner sensor 163 is used to detect whether the toner has been recovered satisfactorily to a toner recovery container. The main motor 164 is used to drive the photoreceptor drum 51, a heat roll 66 or a conveyer system from the matching (registration) of timing at which the copying paper 60 is conveyed up to the discharging time.

(5-2) Switching mechanism of developing device.

Figure 9:
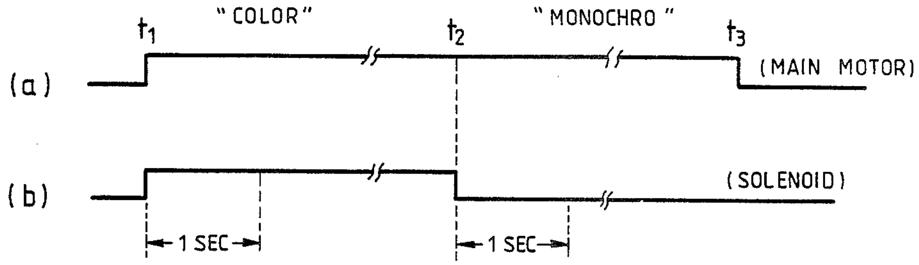

FIG. 9 is a waveform chart illustrating the switching timing of the main developing device and the sub-developing devices of this embodiment. The waveform chart exemplifies red color developing first carried out in the first developing device 59S1 and monochromatic developing secondly made in the main developing device. When the start button 117 (FIG. 5) of the copying machine is pressed in order to start copy-making operations, the main motor 164 is driven from time $t_1$ as shown in FIG. 9(*a*). The main motor 164 is being continuously driven up to $t_3$, when the copy-making operations are completed in both two developing devices 59S1, 59M.

FIG. 9(*b*) represents the drive timing of the developing device selecting solenoid 161. The developing device selecting solenoid 161 is kept excited until red copy-making operations by the first sub-developing device S1 are transmitted. A lever abuts against the peripheral face of a clutch (not shown) because of the excitation of the developing device selecting solenoid 161 in this copying machine. On receiving the driving force from the main motor 164, the clutch shifts by 72 degree at a time and starts the rotation of five sets of cams (not shown), each having a protrusion. When one of the protrusions abuts against the first sub-developing device S1, it presses the first sub-developing device 59S1 toward the photoreceptor drum 51. The protrusions of the remaining cams are left most apart from the main developing device 59M and the other sub-developing devices 59S2–59S4, and the main developing device 59M and the other sub-developing devices 59S2–59S4 remain most apart from the photoreceptor drum 51.

There are five protrusions disposed on the periphery of the clutch and, when the lever abuts against the protrusion involved, the protrusion corresponding to the one cam is most strongly pressed against the first sub-developing device 59S1. Development with red color toner is made in that position. However, since the main developing device 59M in the initial state is arranged close to the photoreceptor drum 51 in this copying machine, the red color development is not started immediately at $t_1$ but kept on standby by one second. At this time, the aforesaid cam sets, in place of the main developing device 59M, the first sub-developing device 9M, the first sub-developing device 59S1 (or the other sub-developing devices 59S2–59S4) to the photoreceptor drum 51.

When the first sub-developing device 59S1 has completed the copy-making operations, the aforesaid five cams move to have the protrusion of the monochromatic cam positioned by the lever, whereas the main developing device 59M is set to the photoreceptor drum 51 for one second after $t_2$. Then the monochromatic developing is carried out.

What has been described above refers to only red color marking but, when marking with a plurality of colors is made, one of the sub-developing devices 59S1–59S4 is successively selected in predetermined order as what is involved and the monochromatic developing is made after the completion of the operation above.

Figure 10:
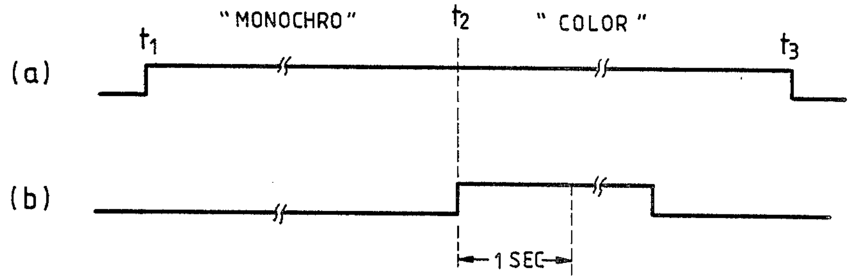

FIG. 10 refers, by way of example, to a case where the monochromatic developing is first made and subsequently followed by red color development. FIGS. 10(*a*) and 10(*b*) are graphic presentations respectively illustrating the operation of the main motor 164 and the developing device selecting solenoid 161. In the case of FIG. 10, development is first carried out by the main developing device 59M and therefore one second of standby time is unnecessary at that point of time. However, one second has to be secured after the completion of the monochromatic development as the second one and the main developing device 59M has to be set again to the photoreceptor drum 51.

(5-3) Optical system.

Figure 11:
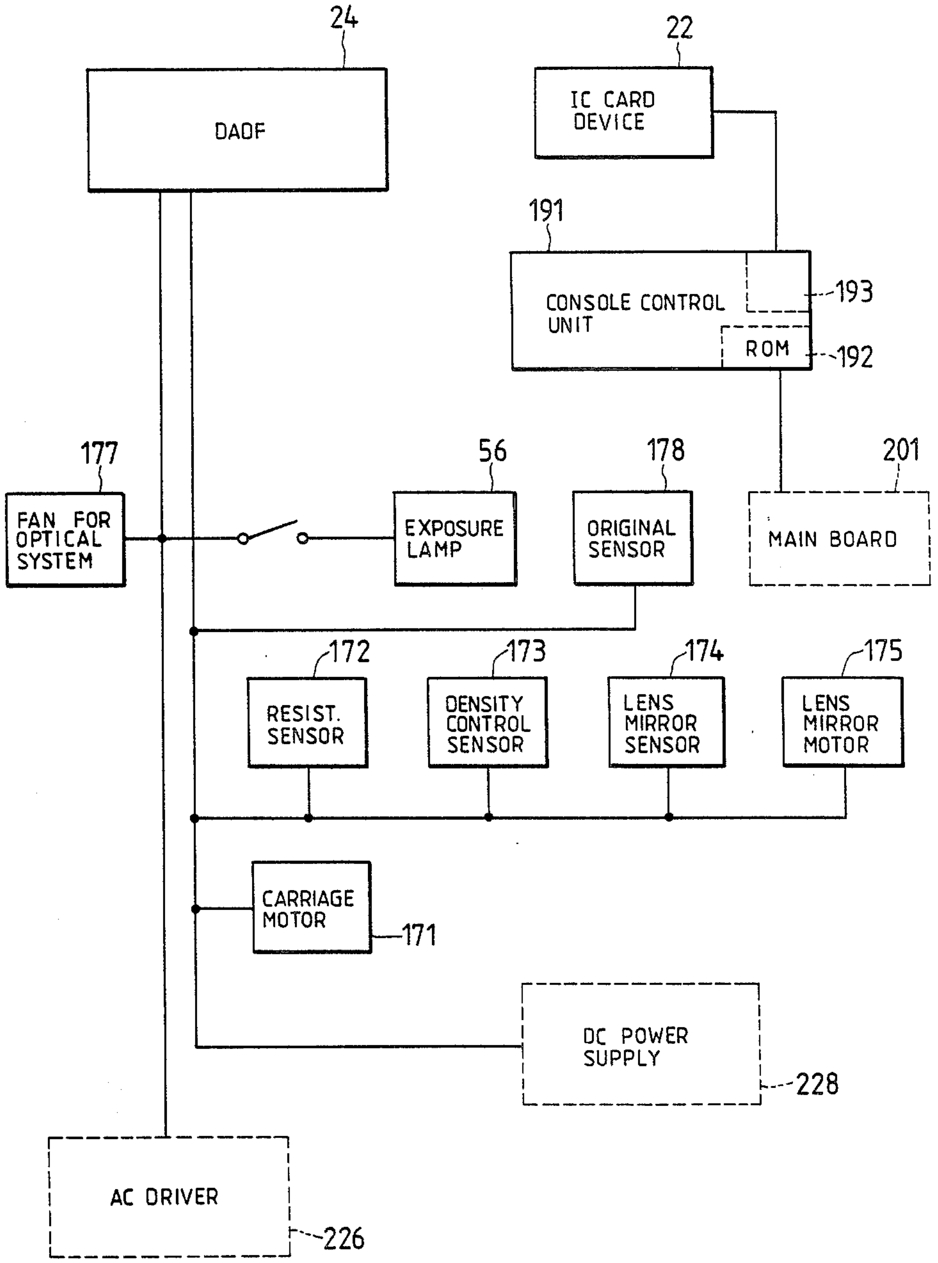

Referring to FIG. 11, an optical system will subsequently be described.

A carriage (not shown) provided with the lens and mirrors is reciprocally operated by a carriage motor 171. The carriage motor 171 includes a step motor and the position of the carriage returning to the home position is controlled by a registration sensor 172.

The registration sensor 172 is used to set the timing at which the optical system and the conveyance of the copying paper 60 is adjusted. In other wards, the carriage is provided with an actuator for intercepting the transmission of light and, as the carriage moves, the registration sensor 172 detects the temporary interruption of the light rays. The signal detected thereby is used to determine the position or timing for implementing the registration or to determine the home position at the time the carriage is returned.

A density control sensor 173 is used to control the copy density of an original. As set forth above, the copying machine in this embodiment is so designed as to control the copy density by simultaneously adjusting the charge quantity given to the photoreceptor drum 51, the image exposure quantity and the developing electrode bias. A lens mirror sensor 174 controls the movement of the optical lens 58 and the mirrors 57 (FIG. 4) and consists of one detecting element. A lens mirror motor 175 has also been redesigned to simultaneously drive the lens 64, the mirror 57 and the like that are separately driven in the conventional copying machine. The exposure lamp 56 has already been described. A fan 177 for the optical system is used to air-cool part of the optical system in order to remove heat from the platen glass plate 55. An original sensor 178 is used to detect the size of an original.

(5-4) Fixing device.

The relation of a fixing device to the others will subsequently be described by reference to FIG. 12.

The base machine 21 in this embodiment is provided with a main fuser lamp 181 and a sub-fuser lamp 182, i.e., two kinds of fuser lamps within the heat roll 66. The sub-fuser lamp 182 is shorter than the main fuser lamp 181 and slightly deviated from one end of the main fuser lamp 181. In this embodiment, the so-called corner registration method is employed, wherein the copying paper 60 in this copying machine is aligned with one side of the platen glass plate 55, whereby the required quantity of heat energy in the axial direction of the heat roll 66 differs with the size of copying paper 60 for use. In order to correct the deviation of the temperature distribution in the axial direction caused thereby, the power supplied to the sub-fuser lamp 182 is controlled, depending on the size of copying paper 60. The adoption of the sub-fuser lamp 182 makes it possible to satisfactorily prevent temperature variations in the fixing device.

A fuser outlet sensor 184 and an STS (Soft Touch Sensor) 185 both are connected to the fixing device. The fuser outlet sensor 184 is employed to detect whether the copying paper is discharged on the discharge tray without being rolled in between both the rolls 66, 67 after it is passed between the heat roll 66 and the pressure roll 67. The S.T.S 165 is the temperature sensor of the fuser lamps 181, 182.

(5-5) Control of console.

Referring to FIG. 11 again, the control of the console will be described

A console control unit 191 is provided with a message ROM 192 for displaying messages in kanjis. The IC card device (IC card reader/writer) 22 for reading and writing the IC card 131 (FIG. 6) and connecting the editor pad 132 (FIG. 6) via an interface board 193 can be connected thereto The IC card device is, as described above, controlled by the card CPU 129 (FIG. 6). The console control unit 191 is connected to a main board 201 with the aforesaid main CPU 121 mounted thereon.

(5-6) Billing counter.

Figure 12:
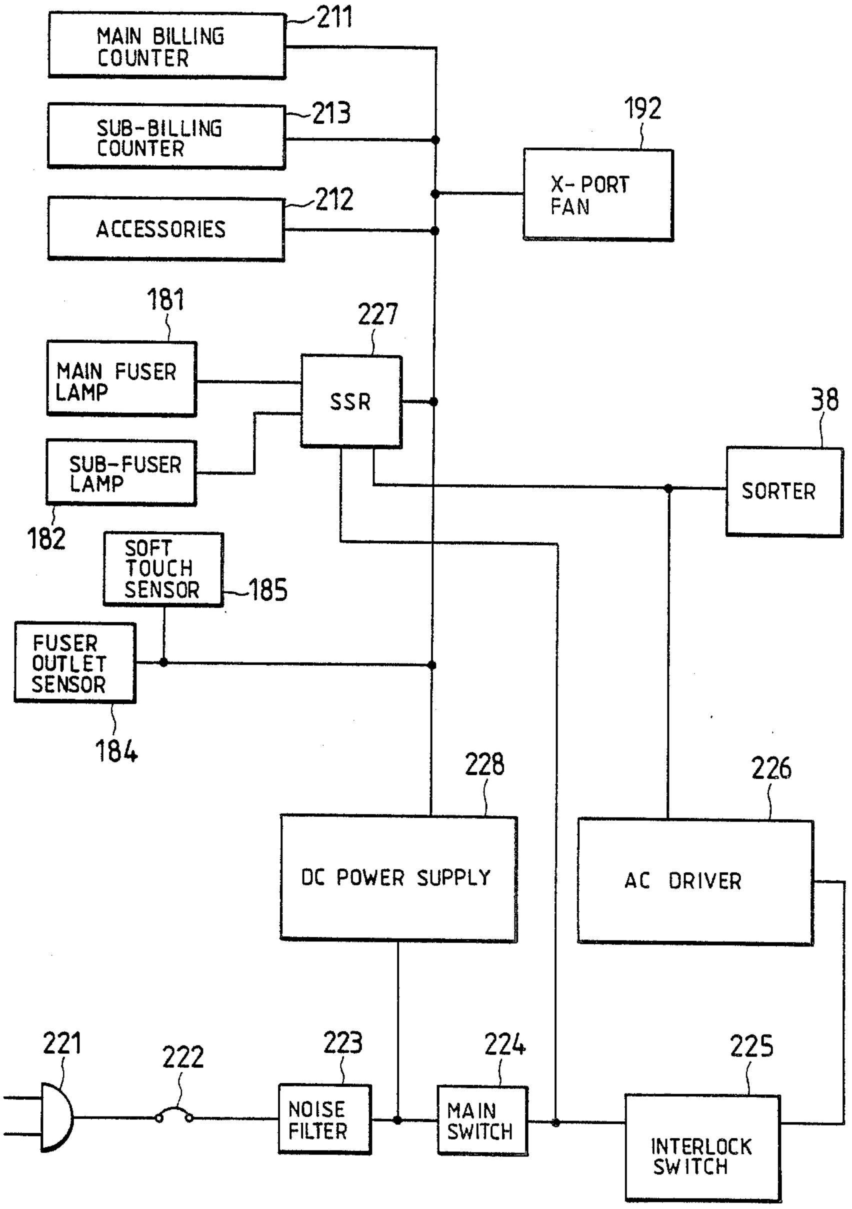

Referring to FIG. 12, a description will be given of a billing counter for use in collecting copying charges.

As the base machine 21 in this embodiment is capable of making copies in five colors, two kinds of billing counters are installed. A main billing counter 211 counts the number of copies taken, irrespective of the color. The values counted by the main billing counter 211 are employed as data for use in controlling counts even when accessories 212 such as a coin kit and a key counter are fitted to this copying machine. A sub-billing counter 213 is used to count the sum of the number of colors used for each color copy taken.

(5-7) Power supply.

Referring to FIG. 12, a power supply will be described.

The base machine 21 is connected to a commercial 100 V power supply. As to those put in overseas markets, it has been arranged that they can be connected to a 115V/60 Hz or 220 V/50 Hz power supply. The power supplyed via a plug socket is given to a main switch 224 through a circuit breaker 222 and a noise filter 223. The power is then suppled form the output of the main switch 224 via an interlock switch 225 to an AC driver 226, a fixing control element 227 and a DC power supply 228. Further, the power is suppled to the DADF 24 and the intermediate tray 33 too.

The AC driver 226 supplies the power to the following parts at predetermined timing.

(i) Deelectrifying erase lamp 155 (FIG. 8).
(ii) exposure lamp 56 and a fan for an optical system (FIG. 11).
(iii) Main fuser lamp 181 and the sub-fuser lamp 182 (FIG. 12).

The DC power supply 228 supplies to the following parts at predetermined timing:

(1) Interlock switch 225 (FIG. 12).
(2) AC driver 226 (FIG. 12).
(3) High-voltage power supply device 162 (FIG. 8).
(4) Sorter 38 (FIG. 12).
(5) Fuser outlet sensor 184 (FIG. 12).
(6) Element 227 for controlling fixation (FIG. 12).
(7) Accessories 212 (FIG. 12).

Accessories includes a coin kit for having copies taken using, e.g., coins and a key counter for controlling copying-making operations in each section.

(8) Main billing counter 211 and a sub-billing counter 213 (FIG. 12).
(9) X-port fan (FIG. 12); a vacuum fan for sucking the copying paper conveyed in a conveyer passage called an X-port.
(10) Inter-image lamp controller 157 (FIG. 8).
(11) Carriage motor 171 (FIG. 11).
(12) Registration sensor 172, density control sensor 173, lens mirror sensor 174 and mirror motor 175 (FIG. 11).
(13) Original sensor 178 (FIG. 11).
(14) Ink lease switch 159, air detecting sensors of sub-developing devices 59S1–59S4 and main developing device 59M and development selecting solenoid 161 (FIG. 8).
(15) Main board 201 (FIG. 8, etc.).

(5-8) Conveyer system.

Figure 13:
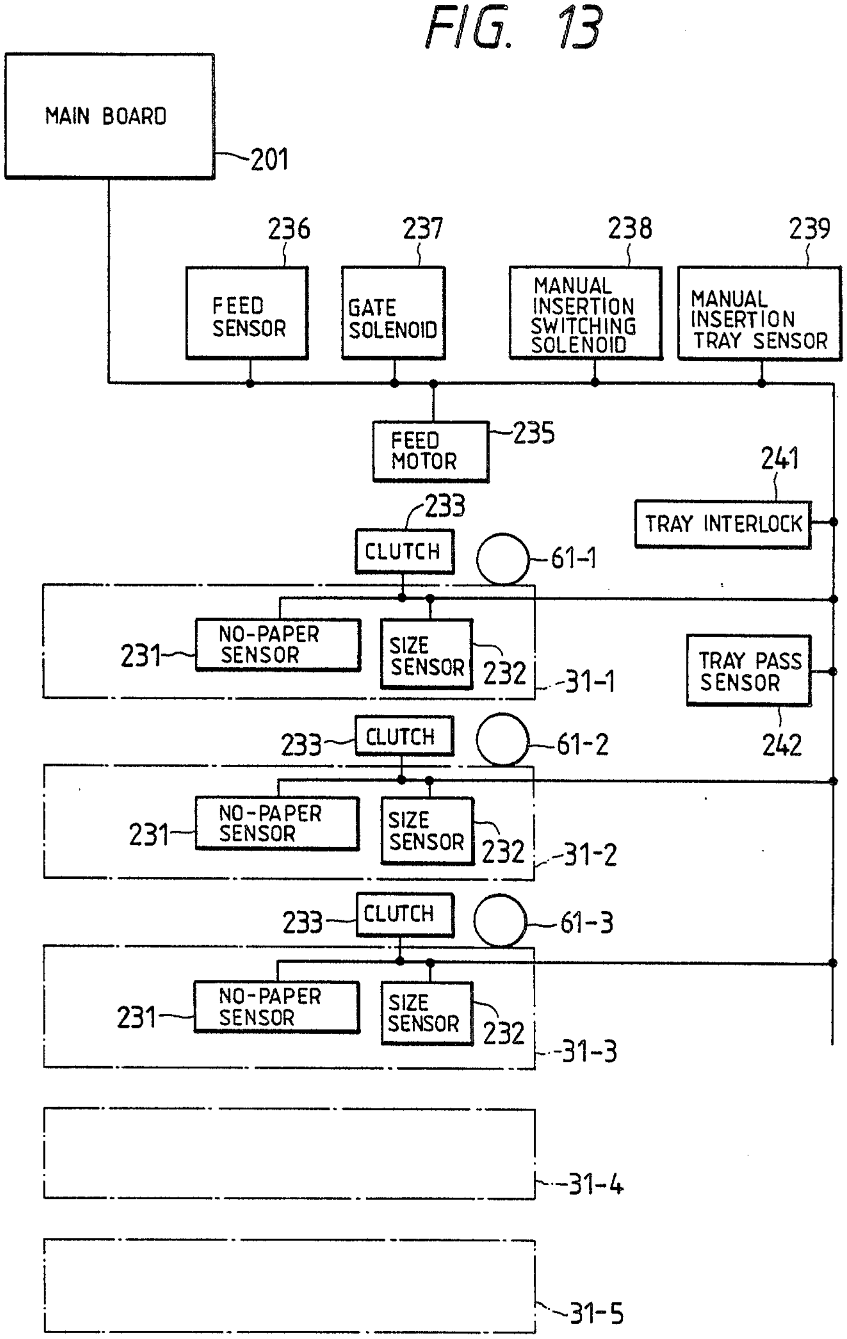

Referring to FIG. 13, a conveyer system for conveying copying paper will be described.

The first-fifth feed trays 31-1～31-5 are provided with no-paper sensors 231, size sensors 232 and clurches 233, respectively. The no-paper sensors 231 are used to detect the presence or absence of copying paper on the feed trays 31-1～31-5. Copying paper of the same size can be set on the plurality of feed trays in this copying machine and copying paper of the same size is automatically suppled from another feed tray when no copying paper is present on one of the feed trays. The size sensor 232 is used to identify the size of copying paper placed on the tray. The clutch 233 is a component part for controlling the on/off state of each of the feed rolls 61-1, 61-2 . . . being driven.

Copying paper is fed by a feed motor 235 for special use in feeding the paper. A step-motor is used as the feed motor 235. A feed sensor 236 detects whether copying paper is being properly conveyed. A gate solenoid 237 is used to true up the front edges of sheets of copying paper sent out once. The gate solenoid 237 is different from an ordinary type and used to control copying paper in such a manner that the paper is passed as it opens when energized.

More specifically, power is not suppled to the gate solenoid 237 in the standby state in which no copying paper arrives thereat and the gate is kept open. Power is then suppled to the gate solenoid 237 slightly before the arrival of copying paper and the gate is shut to check the passage of the copying paper. The gate solenoid 237 is subsequently deenergized and opened at the point of time the copying paper is conveyed again at the predetermined timing. The gate solenoid 237 is so controlled that its position less fluctuates at the point of time the front edge of copying paper is held in check. The copying paper is thus accurately positioned even while it is relatively strongly pressed against the gate solenoid 237.

A manual insertion switching solenoid 238 is used to switch the driving of a carrier roller for conveying copying paper sent out from the first feed tray 31-1 and a carrier roller for conveying copying paper manually fed from the tray 41 for manual insertion. A manual insertion tray sensor 239 detects the presence of copying paper when sheets of copying paper are fed from the tray 41 for manual insertion. A tray interlock switch 241 is fitted to a mechanism operated to remove the copying paper jammed. A tray pass sensor 242 detects the copying paper 60 supplied from the second and third feed trays 31-2, 31-3 and arranged near the connections of the base machine 21 and the respective feed trays 31-2, 31-3.

(5-9) DADF.

Figure 14:
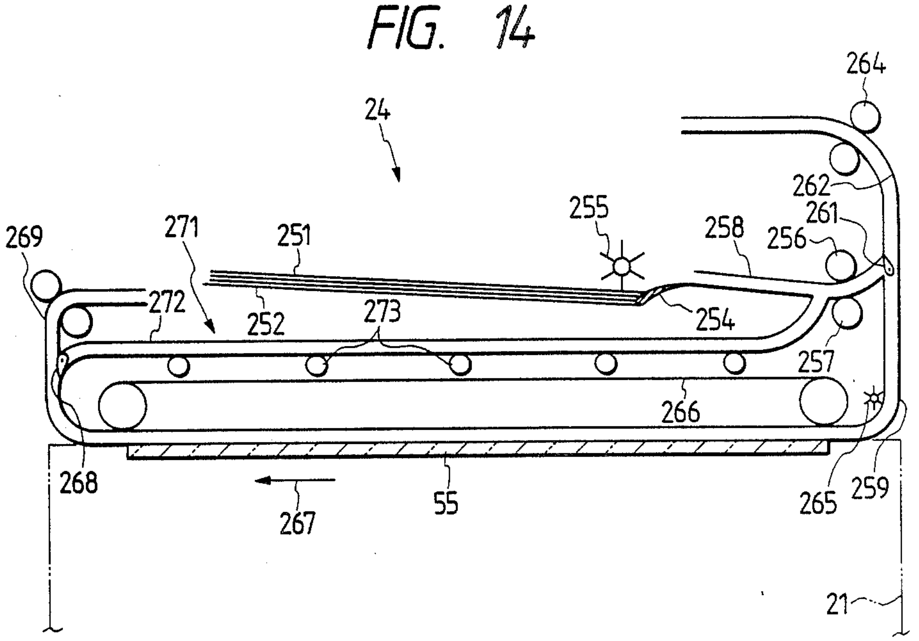

Referring to FIG. 14, the DADF .24 will be described in detail.

The DADF 24 is mounted on the platen glass plate 55 of the base machine 21 and provided with an original tray 252 on which originals 251 are placed. Originals 251 are piled on the original tray 252 in such a manner that the first side of each from which a copy is taken faces down.

A return pad 254 and a feed paddle 255 are disposed on one side of the original tray 252 from which originals 251 are sent out one after another. The original 251 thus fed is moved by a driving roller 256 and a driven roller 257 and passed through an S-shaped conveyer 258 before being pressed against a branch guide 261 arranged in the position where the S-shaped conveyer 258 and a vertical conveyer 259 intersect. The branch guide 261 is opened thereby and the original 251 is sent to an inverted conveyer 262.

When the rear end of the original 251 passes through the branch guide 261, the branch guide 261 is stopped on the S-shaped conveyer 258 side because of the action of a spring (not shown). Then the passage of the original 251 is detected by a sensor (not shown) arranged close to the branch guide 261. A driving roller 264 for inverting the original responds to the detection signal output and turns inversely. As a result, the direction in which the original 251 is conveyed is inverted and changed to what is roughly perpendicular to the platen glass plate 55.

The original 251 is being conveyed while one side of the original abuts against a side positioning guide (not shown) because of an oblique slip paddle 265 and thus adequately positioned. The original is further carried by an endless conveyer belt 266 up to a proper position on the platen glass plate 55. In this manner, a copy of the first side of the original 251 is taken.

After the completion of exposure of the first side, the original 251 is conveyed by the endless conveyor belt 266 in direction of arrow 267. When one side only is coupled, a vertical conveyer 269 is selected by a guide on the outlet side and the original 251 is received by an original receiving part 271.

If the second side opposite to the first one is copied, a horizontal conveyer 272 is selected. The original 251 fed onto the horizontal conveyer 272 is conveyed by a carrier roller 273 in the direction opposite to the arrow 267 and further conveyed by the driving roller 256 and the driven roller 257 to the S-shaped conveyer 258. At this time, the underside of the original 251 is the second side which is opposite to the first side of the original placed on the original tray 252. Accordingly, the second side is copied when the original 251 is sent to the platen glass plate 55.

The original 251 is sent to the vertical conveyer 269 by the action of the guide 268 on the outlet side after the exposure of the second side and discharged onto the original receiving part 271.

(5-10) Sorter.

Figure 15:
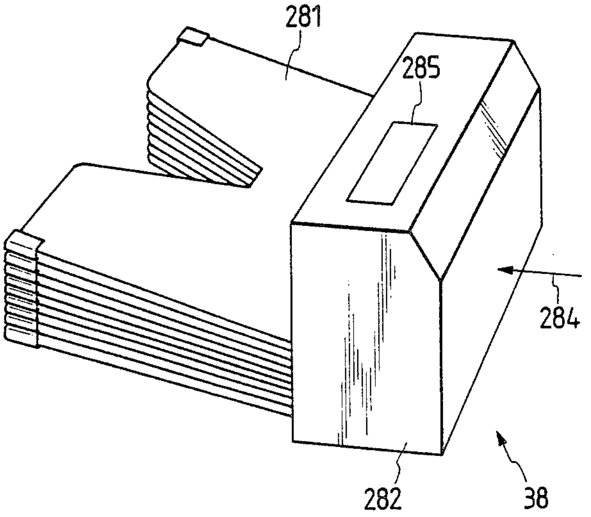

Referring to FIG. 15, the 10-bin sorter 38 will be described in detail.

FIG. 15 is an external view of the sorter. The 10-bin sorter 38 is constructed so that 10 sheets of bins 281 are integrally moved up and down. The sorter proper 282 consists of a driving source (bin motor) for moving them up and down, a cam and a cam switch for controlling the movement of each bin, and a down limit switch (both not shown) for detecting the arrival of the bins 281 at the lowest limit position.

Copying paper 60 is moved by the carrier rolls 68, 68 shown in FIG. 4 in direction of arrow 284 and fed into the sorter proper 282 and, at this point of time, discharged onto the bins located opposite to the conveyer passage. Some sorters are designed to switch the discharge passage by not moving the bins 281 but the sorter proper 282. Mode selection in the sorter 38 is effected by operating the panel 74 for a sorter shown in FIG. 5.

(5-11) Editor pad.

Figure 16:
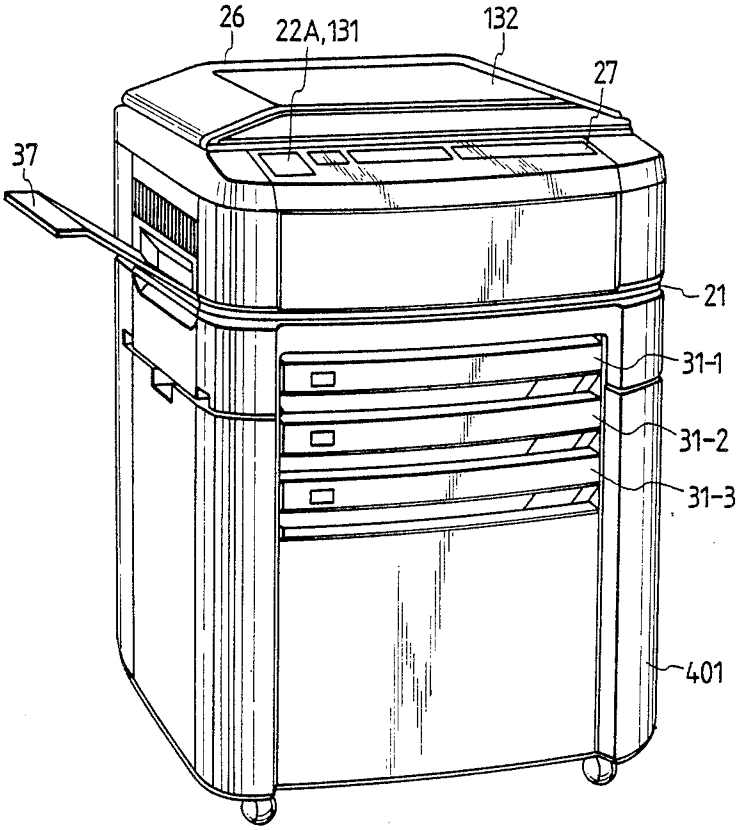
Figure 17:
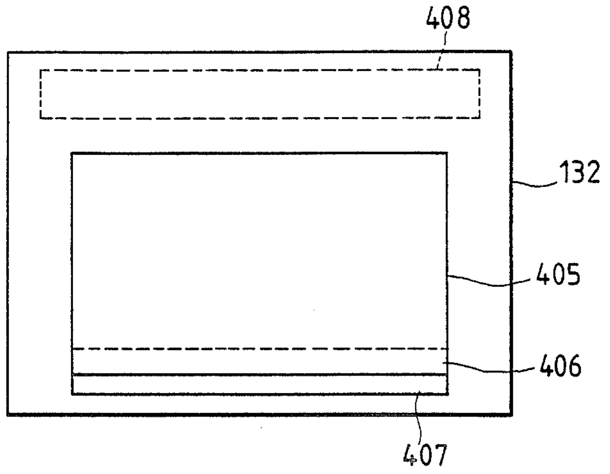

Referring to FIGS. 16 and 17, an editor pad 132 will be described in detail.

FIG. 16 shows the system configuration of a copying machine with an editor pad. More specifically, because the copying machine embodying the present invention is equipped with the DADF 24 mounted on the platen glass plate 55 as shown in FIG. 3, the platen 26 with an editor pad cannot be mounted thereon.

In the copying machine shown in FIG. 16, the platen 26 with the editor pad is mounted on the base machine 21 equipped with the first feed tray 31-1. The editor pad 132 is located in a square portion in FIG. 16. This copying machine is provided with a back lit type console panel. Moreover, a cabinet 401 containing only the second and third feed trays 31-2, 31-3 is arranged under the base machine 21. The base machine 21 is fitted with no sorter and the discharge tray 37 for receiving the discharged copying paper is installed.

As to the general construction of the copying machine, see FIG. 2. The editor pad 132 is extremely convenient for an coordinate input and usable as an independent unit for the copying machine shown in FIG. 3 as an embodiment of the present invention. In this case, the editor pad 132 may be placed on a desk or the like and directly connected to the IC card device 22 (FIG. 3) with a cord or coordinate data may be written to the IC card 131, which is then mounted on the IC card device 22 for use.

FIG. 17 illustrates the construction of the editor pad. The editor pad 132 is provided with a rectangular coordinate input pad 405 which is 307 mm long and 432 mm wide. An area 10 mm wide on this side of the pad is employed as an editor panel 406. The editor pad 132 including the editor panel 406 is such that a first rubber pad with a resistance wire for designating a position on the abscissa and a second rubber pad with a resistance wire for designating a position on the ordinate are superposed with a spacer sandwiched therebetween. The position pressed by the finger of the operator or tip of a pen is sensed in the form of values on the abscisa and ordinate. On this side of the editor panel 406 is a display panel 407 for displaying various kinds of data. Moreover, a circuit board for processing coordinate data and a circuit board 408 for an interface circuit are disposed in the rear portion of the editor pad 132.

Figure 18:
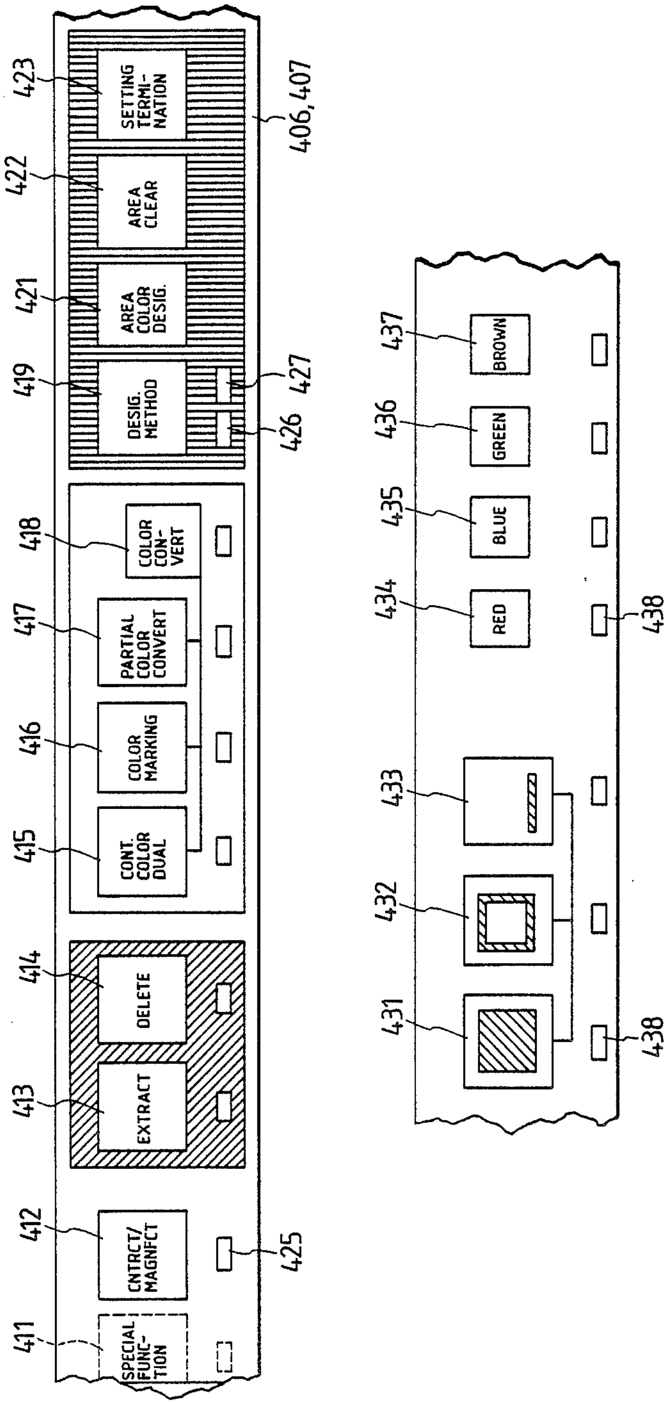

FIG. 18 shows the editor panel illustrated in FIG. 17 and the principal part of the display panel. The following buttons are disposed on the editor panel 406:

(i) Special function button 411 for use when special functions are employed.

(ii) Button 412 for dimensional alteration and redoubling: used to specify contraction/magnification by designating distances.

(iii) Extraction button 413 for extracting the area specified: used for monochromatic recording.

(iv) Deletion button 414 for deleting the area specified: also used for monochromatic recording.

(v) Continuous copying color dualizing button 415, which is a function button for designating the continuous copying color dualizing function.

(vi) Color marking button 416, which is a function button for specifying the color marking function.

(vii) Partial color conversion button 417 used to specify the function of partially converting color.

(viii) Color inversion button 418 used to convert the area specified as color to black and the area specified as black to color. The continuous color dualizing button 415, the color marking button 416, partial color conversion button 417 and the color inversion button 418 are all function buttons for color recording.

(ix) Designation method button 419 used to choose whether an area is specified with the coordinates of two points at both ends of a diagonal line of a rectangle or the coordinates of each point of a polygon.

(x) Area color designation button 421 used when an area is specified.

(xi) Area clear button 422 used to release the designation of an area.

(xii) Setting termination button 423 used when the designation of one or a plurality of areas is completed.

To the display panel corresponding to the first 8 buttons 411–418 are attached display lamps 425 for displaying whether the respective 8 buttons 411–418 have been selected. As for the designation method button 419, a diagonal designation lamp 426 or a polygon designation lamp 427 is lit, depending on the designation selected.

(xiii) Normal marking button 431 used to specify the normal marking form for uniformly marking an area; e.g., marking a rectangular area.

(xiv) Side marking button 432 used to mark, e.g., the specified area enclosed with a frame.

(xv) Line marking button 433 used to mark, e.g., the specified area like a thick underline (xvi) Color designation buttons 434–437 for specifying a color relative to a marking area because the marking color can be determined independently on an area basis. In this case, the color designation button 435 is used to specify red and the color designation button 435 to specify blue. The color designation button 436 is employed to specify green and the color designation button 437 to specify light brown. As set forth above, the copying machine in this embodiment permits colors other then the above-described ones to be set and, in this case, top covers attached to the surface of the color designation buttons 434–437 will have to be replaced with desired ones, respectively. Display lamps 438 are annexed to the buttons 431–437 for special use in marking, which have been described in (xiii)–(xvi), respectively, in order to display which one of the lamps has been selected.

(6) Paper tray control system.

(6-1) Paper tray.

In the copying machine involved in the present invention, the first to third supply trays 31-1∼31-3 are fitted to the base machine. However, the intermediate tray 33, the forth tray 31-4, the fifth tray 31-5 and the large capacity tray 471, together with the DADF 24 and the IC card device 22, etc., are arranged as additional devices attachable as options when the users so desire. Moreover, the paper trays as the additional devices in this copying machine can selectively be added with the combinations described in FIG. 2, whereby the control of the paper trays corresponding to the respective combinations becomes required.

Particularly, the mechanism of the intermediate tray 33 is needless to say quite complicated in that it has various functions different from those of other paper trays and therefore needs complicated control. If the intermediate tray 33 is attached, for instance, the paper used for copying can be restored thereon and besides it can be set upside down or with its surface usable as a copying side again. In other wards, the intermediate tray 33 is the duplex-dual tray module (DDM) for use in taking a copy again, which consists of two modes: the duplex mode and the dual mode. The mode switching is effectuated at the console panel. The usable function of the intermediate tray 33 varies with whether or not the DADF 234 has been added. Only the presence of the DADF 24, for instance makes usable the duplex original-one-side copying function but not the duplex original-duplex copying function. When the intermediate tray 33 is added, however, the sheet dualizing, parallel dualizing, color marking, continuous copying color dualizing, partial color converting functions, etc., so say nothing of the duplex original-duplex copying and one-side original-duplex copying ones become usable.

The sheet dualizing in the editing function is such that both the first and second originals as a whole are superposed and recorded on one sheet of copying paper. In the copying machine in this embodiment, up to five areas on the first original can be designated and further copies of the first and second originals can be taken in different colors respectively using different monochromatic color switches 91. On the other hand, the parallel dualizing function is employed to the whole of the second original is attached to that of the first original in order to make a dual copy of them on one sheet of copying paper. The original is sent out of the ADF 23 or DADF 24. The parallel dualizing function is unusable in a copying machine equipped with none of them. If the switch 88 is pressed to designate an area where marking is provided, recording is carried out with thin color superposed thereon so that it looks as if it were provided with the marking. In the case of the continuous copying color dualizing function, it is employed to record one color in the designated area of a copy, wherein a figure to be expressed is place, e.g., to the right of the platen glass plate 55 and an original to the left thereof while the switch 90 is pressed. When a copy of the original is taken in that state, the image data thereof is copied in black and a monochromatic figure is drawn thereon. With the partial color converting function, the switch 89 is pressed to designate an area, which is copied monochromatically, the remaining portion being copied in black.

If the control software is loaded on the copying machine proper, with the DADF 24 and other additional devices added to make it multifunctional, the paper trays have to be controlled variably in conformity with the functions selected. However, the present invention contrives to make it unnecessary to change the control system on the part of the base machine even though the intermediate tray and other paper trays are added or otherwise the arrangement of them is altered but to flexible deal with such a situation by means of device. More specifically, the main controller means having the main CPU 121 and the tray controller means having the CPU 128 for controlling trays are connected by the communication lines 123, 124 and the tray controller operates to control the paper tray added under the control of the main controller through serial communication.

(6-2) Outline of paper tray control system in general.

Figure 19:
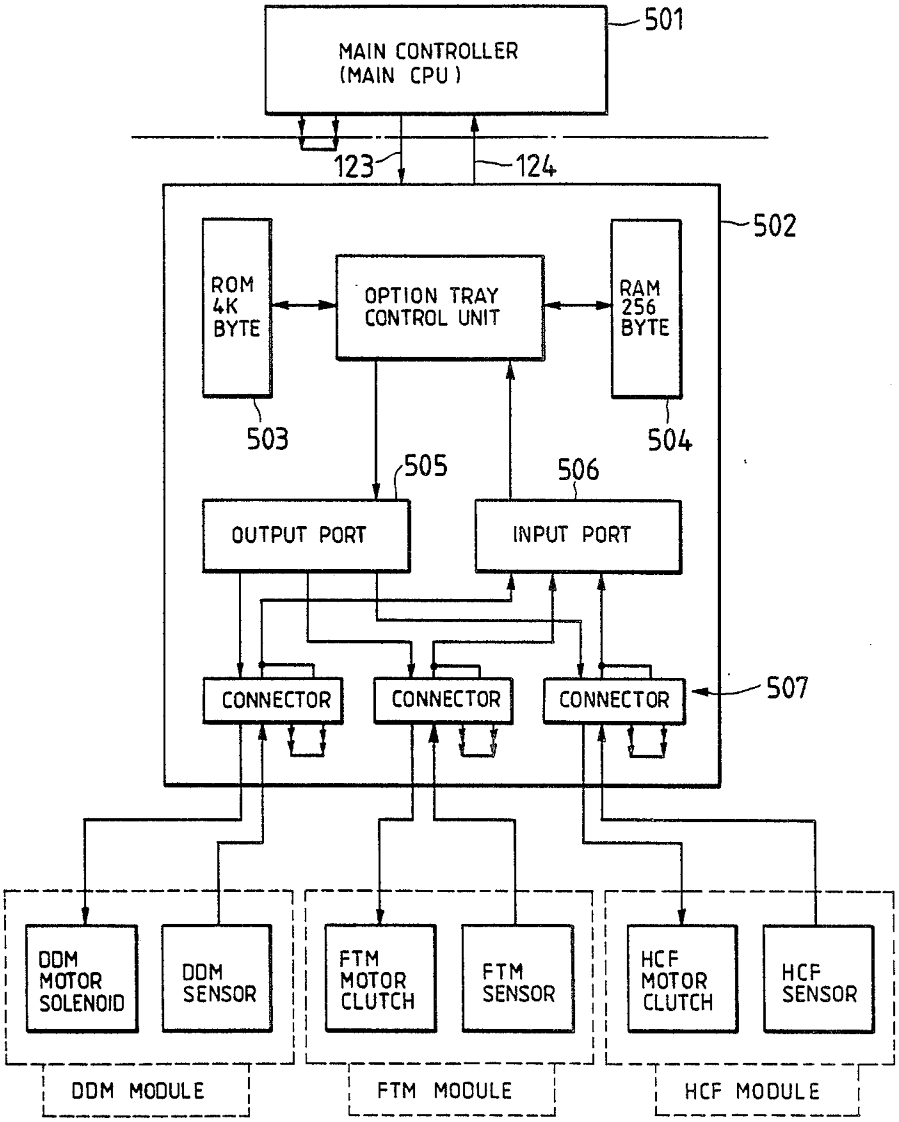

FIG. 19 is a schematic block diagram of an overall paper tray control system.

In FIG. 19, there is shown a main controller 501 comprising the main CPU 121, the ROM 121D, the RAM 121E, the I/O controllers 121J, 121G, etc. as described with reference to FIG. 7, the main controller 501 being connected via the serial lines 123, 124 to a controller 502 for controlling trays Control and status data is exchanged between the main controller 501 and a tray controller 502 through serial communication. The tray controller 502 comprises a tray control CPU 128, a ROM 503, a RAM 504, an output port 505, an input port 506, connectors 507, etc., whereas modules motors of the DDM (intermediate tray), FTM (fifth tray) and HCF (large capacity tray) as additional devices, solenoids and various sensors for detecting jamming and the status of other paper trays are connected to the connectors 507, which detect the presence or absence of the modules and transmit the respective signal detected to the main controller 501 via the serial lines 123, 124.

(6-3) Serial communication system.

Figure 20:
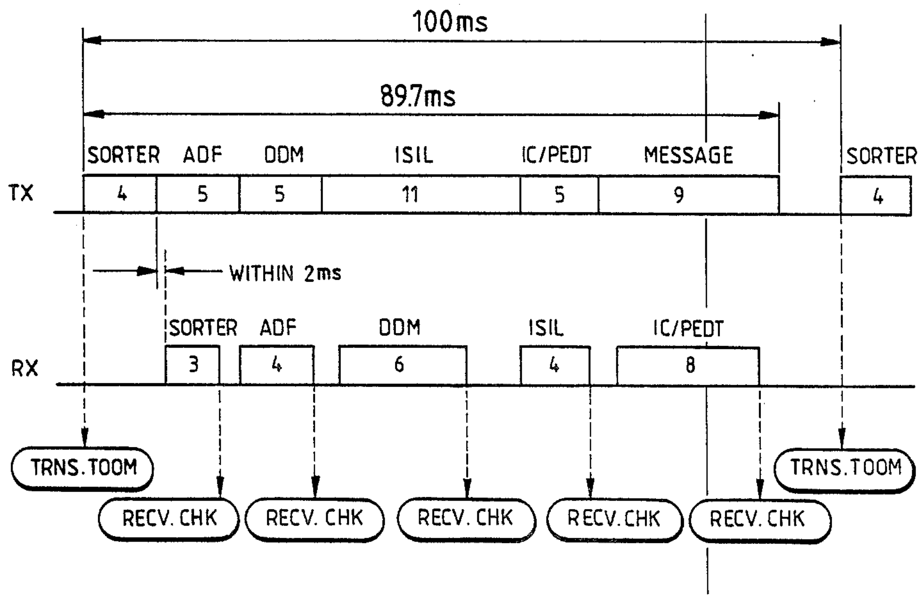
Figure 21A:
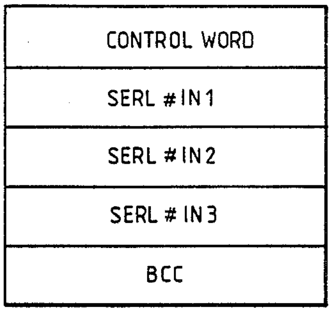
Figure 21B:
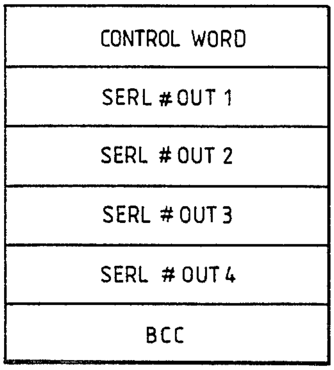
Figure 22A:
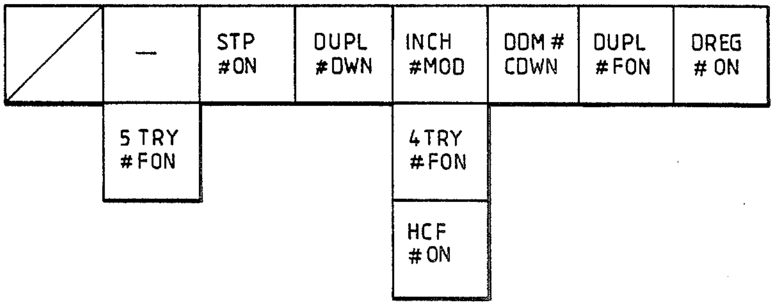
Figure 22B:
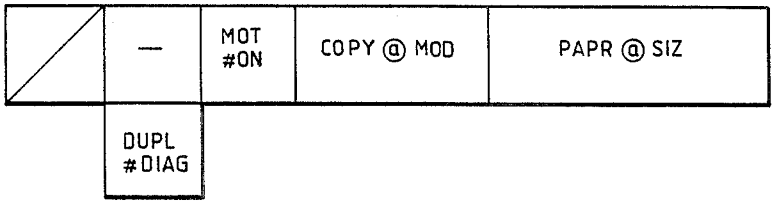

FIG. 20 is a serial communication timing chart; FIG. 21 is a diagram illustrating the structure of serial communication data exchanged between the main controller and the tray controller; FIG. 22 is a diagram explanatory of a serial reception signal; and FIG. 23 is a diagram explanatory of a serial transmission signal.

As described with reference to FIG. 6, the communication lines 123, 124 connect the main CPU 121 of the main controller 501 and the tray control CPU 128 of the tray controller 502. The serial communication is carried out via the communication lines 123, 124 with timing at which transmission and reception are made in the order shown in FIG. 20 with a period of 100 msec. As shown in TX, 4-byte data, 5-byte data and 9-byte data are respectively transmitted from the main CPU 121 via the serial line 123 to the sorter CPU 126, to the original feed CPU 125 and the tray control CPU 128 and to the display CPU 127. Upon receiving the data, each CPU returns the data having the bit structure shown in RX via the serial line 124 to the main CPU 121 at the timing shown therein.

The signal received by the tray controller from the main controller consists of, e.g., an X'C5' control word, SERL#IN1 of one shot data, SERL#IN2, SERL#IN3 of level data and a check code BCC shown in FIG. 21(*a*), whereas the signal transmitted by the tray controller to the main controller consists of an X'C6' control word, SERL#OUT1~4 of level data and a check code BCC shown in FIG. 21(*b*).

(i) Signal received by the tray controller.

The SERL#IN1 of one shot data consists of data shown in FIG. 22(*a*) and DREG#ON, for instance, is set immediately after the register gate of the machine body is turned on, provided it is thus set only in the intermediate tray stock mode, whereas the DUPL#FON is set when paper is fed from the intermediate tray. HCF#ON is set when paper is fed from the large capacity tray, whereas 5TRAY#FON (4TRAY#FON) is set when paper is fed from the fifth supply tray 31-5 (fourth supply tray 31-4). INCH#MOD is used when the serial communication is initially made as data for sorting paper size into inch/AB series. The SERL#IN1 of one shot data is set in the main controller under those conditions.

The SERL#IN2 of level data consists of data shown in FIG. 22(*b*) and MOT#ON, for instance, is set immediately after a main motor 164 is turned on and cleared immediately after the main motor is turned off. COPY@MOD is data indicating (DUPLEX NORMAL), (DUPLEX CONTINUOUS PAGINATION) and other modes, whereas PAPR@SIZ is data indicating paper size.

The SERL#IN3 of level data consists of data shown in FIG. 22(*c*) and DUPL@QTY, for instance, is data indicating the number of sheets of paper accommodated on the intermediate tray, whereas PHND#ILK is data set when the right side panel is opened.

Moreover, (DIAG) is data for self-diagnosis.

(ii) Signal transmitted from the tray controller.

SERL¥OUT1 of level data consists of data shown in FIG. 23(*a*) and DFLT@COD, for instance, is data indicating jam timer setting data, whereas OPTN@SEL is data for selecting options such as (DDM M/C) and (HCF M/C).

SERL¥OUT2 of level data consists of data shown in FIG. 23(*b*) and DDM¥LILK, for instance, is turned on when the left side interlock of the intermediate tray is opened and DDM¥DRV is turned on/off synchronously with the DDM drive motor 361, whereas C6¥JAM is turned on when C6-1JAM occurs. Moreover, DTRAY¥OK is turned on when the intermediate tray setting up is completed in its feed mode, whereas DDM¥TILK is turned on when the tray interlock of the intermediate tray is opened.

SERL¥OUT3 of level data consists of data shown in FIG. 23(*c*) and HCF@SIZ and 4TRAY@SIZ, for instance, are data indicating paper size and setting up conditions. C7YJAM is turned on when C7-1JAM occurs, whereas DFHYJAM is turned on when C8-2JAM occurs.

SERL¥OUT4 of level data consists of data shown in FIG. 23(*d*) and HCF¥RDY, for instance, is turned on when the large capacity tray is ready and HCF¥1LK is turned on when the interlock of the large capacity tray is opened, whereas HCF¥NOP is turned when no paper is present on the large capacity tray.

(6-4) Intermediate tray control system.

Figure 24:
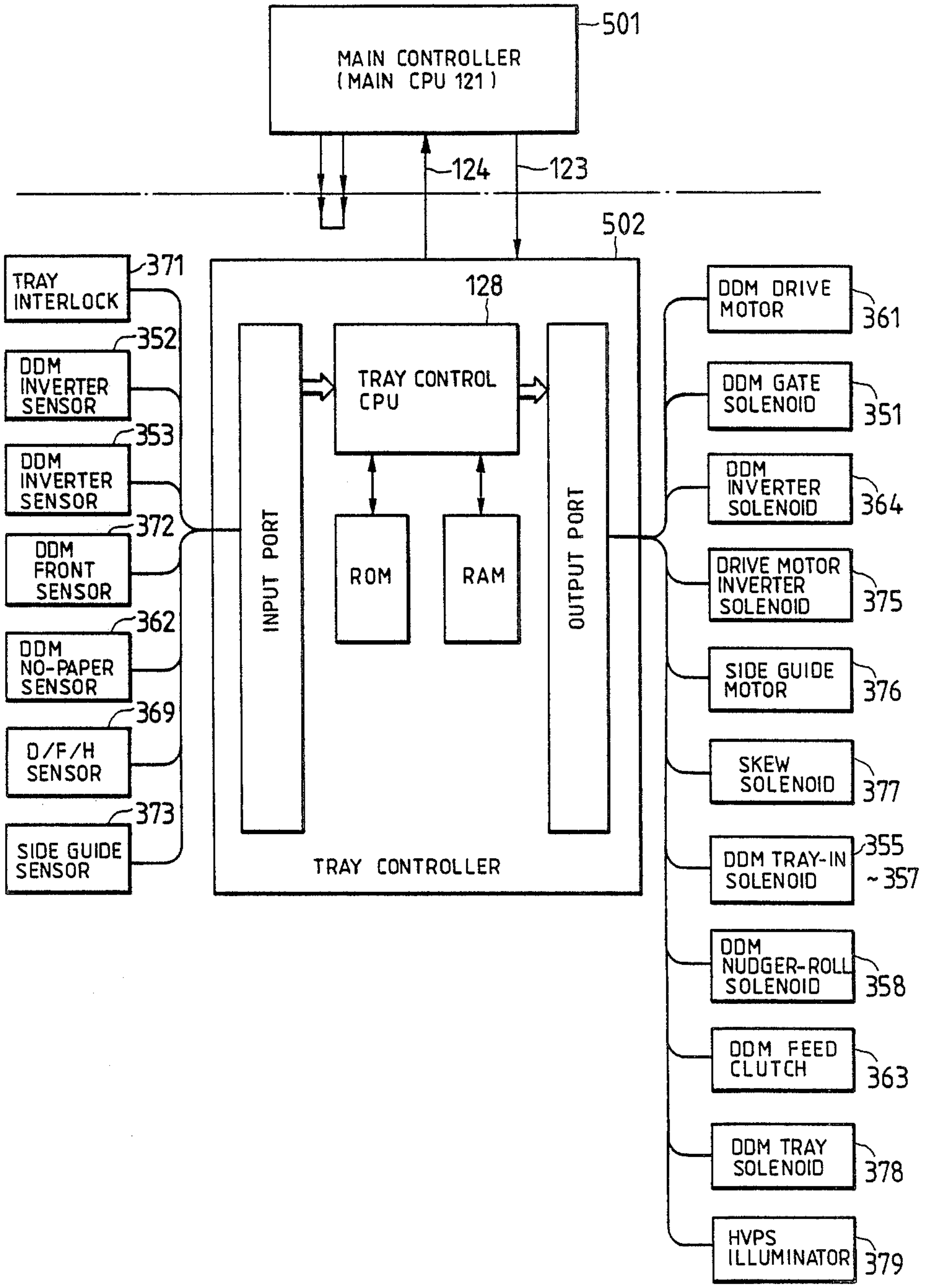
Figure 25:
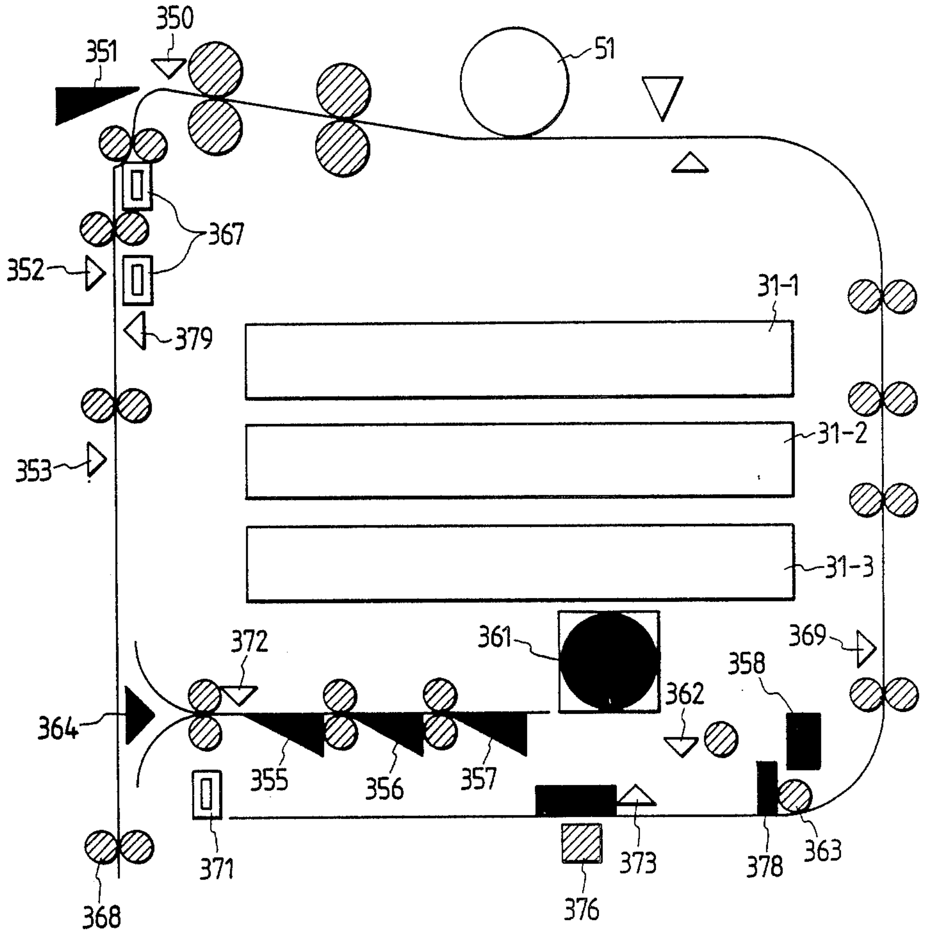

FIG. 24 is a diagram illustrating an intermediate tray control system configuration and FIG. 25 is a schematic view of a conveyer system centering around the intermediate tray.

FIG. 24 is a block diagram illustrating the intermediate tray (DDM) portion in the paper tray control system shown in FIG. 19. As described above, the intermediate tray control system controls the intermediate tray 33 by means of the tray controller 502 having the tray control CPU 128 and connected via the communication lines 123 and 124 to the main controller (FIG. 7) having the main CPU 121 on the base machine side. Simple signals are exchanged through serial communication between the controller 501 for controlling the machine body (base machine) and the controller 502 for controlling the intermediate tray so as to control duplex/dual copying paper. For this purpose, the sensors and driving mechanisms are connected to the input and output ports of the tray controller 502 respectively as shown in FIG. 24, and FIG. 25 is a schematic diagram of the intermediate tray with an arrangement of them.

Referring to FIG. 25, the intermediate tray 33 will subsequently be described.

The copying paper 60 thermally fixed by the heat roll 66 in the base machine 21 is controlled so that it is moved by the DDM gate solenoid also disposed in the base machine 21 toward the discharge tray or sent toward the intermediate tray 33. A first DDM inverter sensor 352 is disposed on the base machine 21 side and a second DDM inverter sensor 353 is arranged near the second supply tray 31-2. Both the sensors detect whether the copying paper 60 has jammed before it reaches the proximity of the intermediate tray.

However, the intermediate tray 33 locks in a feed roll for feeding the front end of the copying paper 60 up to the front end of the tray. Accordingly, three DDM tray-in solenoids 355–357 for use in conveying the copying paper 60 thus fed up to a desired position, depending on its size, and "dropping" onto the tray. These tray-in solenoids 355–357 are selectively operated according to the size of the paper thus fed to switch on/off the corresponding gate. A DDM measure roll solenoid 358 is a gate for controlling the copying paper 60 thus dropped so that an angle of its front end abuts against an angle of the front end of the intermediate tray 33 and for aligning the front ends of the copying paper thus fed one after another. The main billing counter 211 is incremented by one each time the operation of aligning one sheet of the copying paper is completed.

As set forth above, the intermediate tray 33 is controlled by the tray control CPU 128 and conveys the copying paper under the control of the DDM drive motor 361. A DDM no-paper sensor 362 is used to detect the presence or absence of the copying paper 60 on the intermediate tray 33. A DDM feed clutch 363 is a mechanism for controlling the on/off operation of the driving source for sending out the copying paper 60.

A DDM inverter solenoid 364 is used to switch the operation of taking a duplex copy to that of marking one and the same side with a plurality of colors or taking a dual copy. When the DDM inverter solenoid 364 is positioned in the direction shown in FIG. 25, the copying paper 60 conveyed so as to drop downwardly along the conveyor passage 365 is guided and dropped by the DDM inverter solenoid 364 before being upwardly conveyed by the conveyer roll 368. The direction in which the copying paper 60 has been conveyed is changed to the right one in FIG. 25 before the DDM inverter solenoid 364 and stored upside down on the intermediate tray 33. When conveyance is restarted in that situation, a duplex copy is taken.

When the copying paper 60 that has been conveyed downwardly is turned right before the DDM inverter solenoid 364, the copying paper 60 is stored with it surface side remaining turned-up. When conveyance is restarted in that condition, the same side is used for copying again. When N kinds of colors are employed for marking, one sheet of copying paper 60 is stored on the intermediate tray N times and monochromatically developed before being discharged.

A D/F/H sensor is used to count the number of sheets of payer sent out of each module.

(6-5) Operational timing of intermediate tray module.

Figure 26:
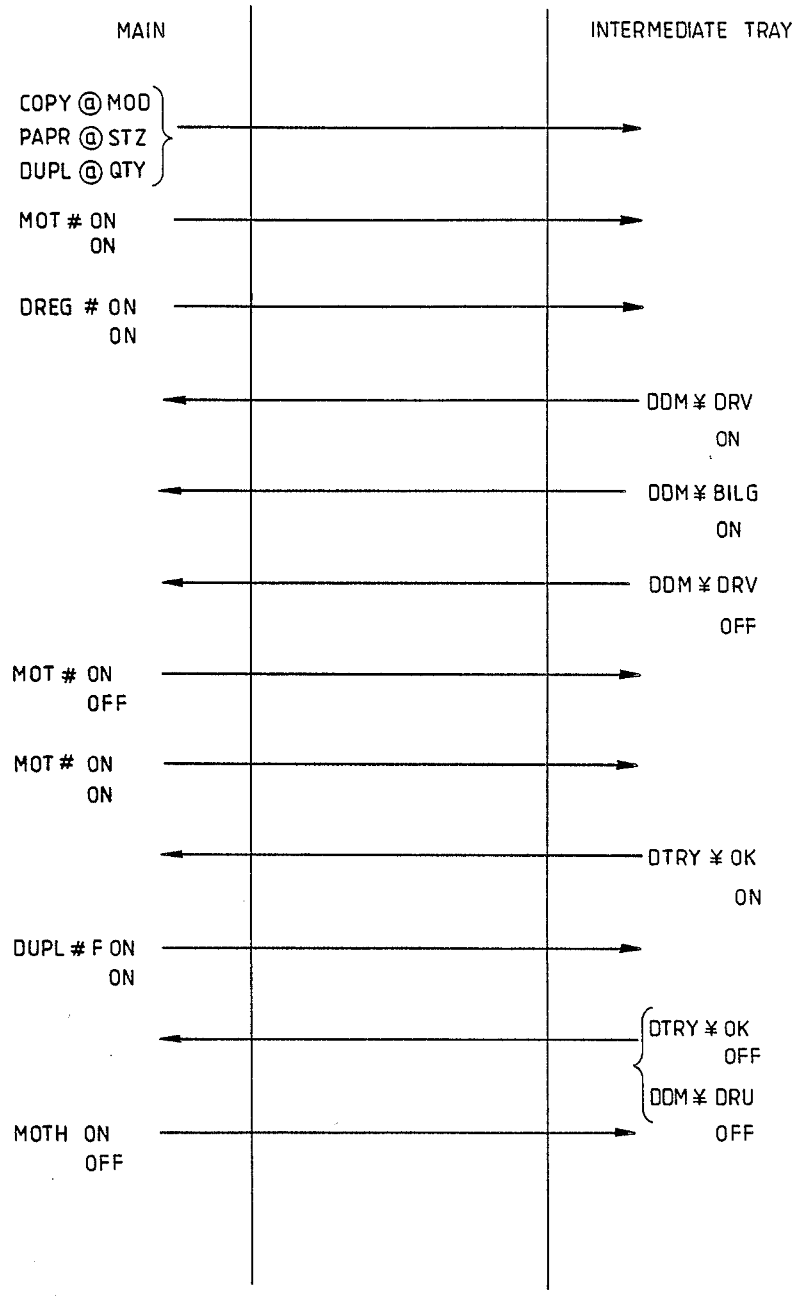

FIG. 26 is a diagram exemplifying the operational timing of an intermediate tray module and the operational timing will subsequently be described.

(1) On receiving an MOT#ON signal, the DDM side enters the RUN mode and is set in a DREG#ON standby state.

(2) On receiving a DREG#ON signal, the timer is started to turn on the DDM gate solenoid 351 and the DDM drive motor 361 a predetermined time later so as to set the position of the side guide 381 by the size received of the PAPR@SIZ.

(3) A DDM#DRV signal is turned on when the DDM drive motor 361 is turned on in order to inform the base machine of the fact that the DDM is in operation.

(4) Which one of the two, duplex of dual copy, is determined with the COPY@MOD transmitted from the base machine then and the DDM is controlled by the sensors and the solenoids on the DDM side and the set number of sheets received of the DUPL@QTY. A DDM¥BILG signal is then turned on each time paper is completely accommodated on the DDM tray and simultaneously the billing counter 211 on the machine side is incremented by one.

(5) When the number of sheets stored on the DDM tray conforms to the set number of sheets received of the DUAL@QTY, the DDM drive motor 361 is stopped and the DDM¥DRV signal is turned off in order to effected the feed mode for taking the paper out of the DDM tray.

(6) Simultaneously with the interruption of the operation of the base machine, the MOT#ON signal is turned off and, on detecting the off state, the DDM side enters the standby mode.

(7) On receiving the MOT#ON signal again, the DDM signal enters the RUN mode and sets the DDM tray capable of being fed. Simultaneously, the DDM¥DRIV is turned on.

(8) When DDM tray becomes capable of being fed, a DTRAY¥OK signal is turned on and a DUPL#FON standby state is brought about.

(9) On receiving the DUPL#FON, feeding from the DDM starts.

(10) After the set number of sheets received of the DUAL@QTY is fed, the DDM drive motor 361 is stopped and the DDM¥DRIV and DTRY¥OK signals are turned off.

(11) Simultaneously with the interruption of the operation of the base machine, the MOT#ON signal is turned off and, on detecting the interruption, the DDM side enters the standby mode.

(6-6) Other paper tray control system and its operational timing.

Figure 27:
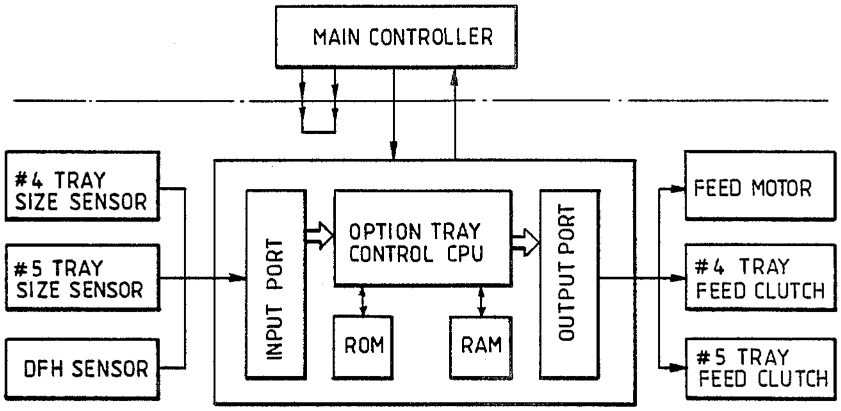
Figure 28:
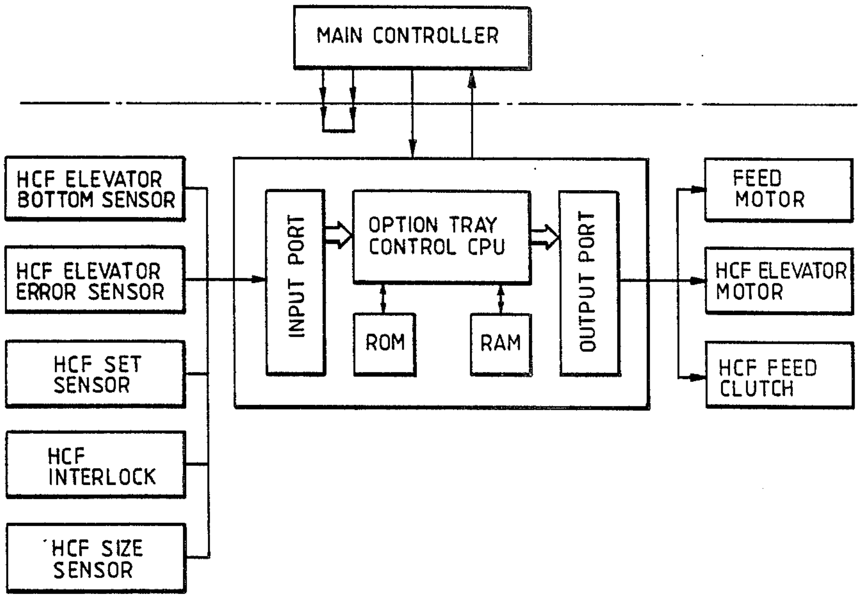
Figure 30:
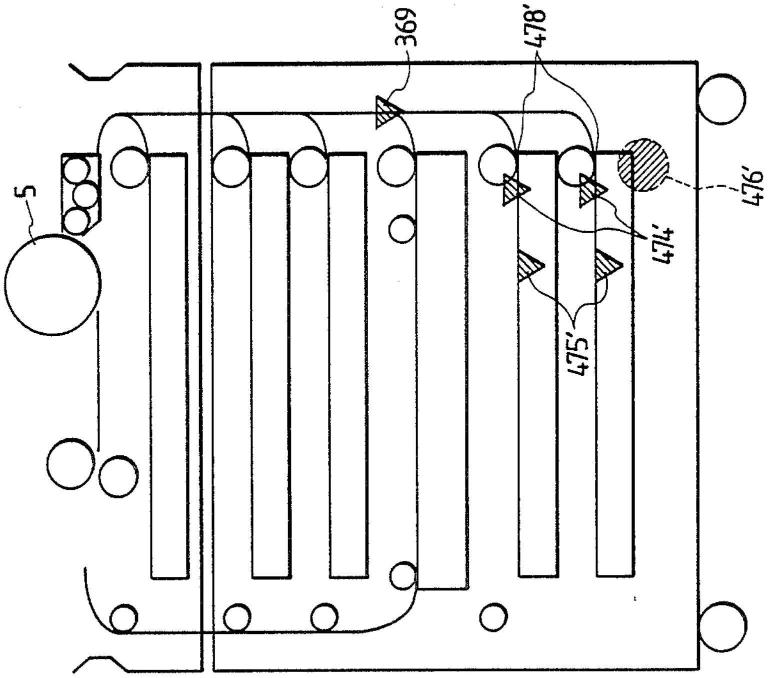
Figure 29:
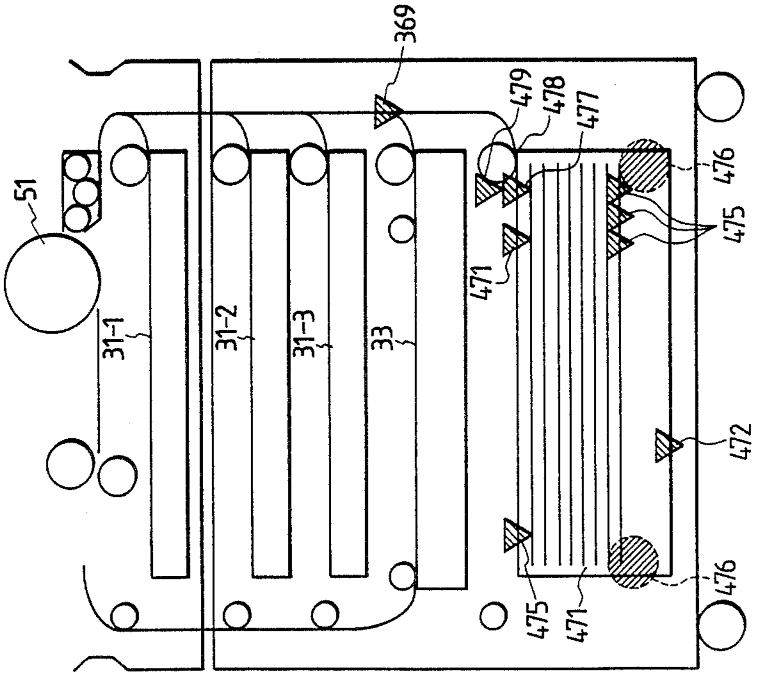

In the copying machine concerned in the present invention, the large capacity tray 471 or fourth and fifth supply tray 31-4, 31-5 instead may be set as set forth above. FIG. 27 is a diagram exemplifying a fourth-fifth supply tray control system configuration. FIG. 30 is a schematic block diagram of a paper supply means equipped with the fourth and fifth supply trays. FIG. 28 is a diagram exemplifying a large capacity tray control system configuration. FIG. 29 is a schematic block diagram of a paper supply means equipped with the intermediate tray and the large capacity tray as additional devices.

1,000–2,000 sheets of copying paper can be set in the large capacity tray 471 at a time and a large quantity of copies can also be taken without interruption. The large capacity tray 471 and the fourth and fifth supply trays 31-4, 31-5 are equipped with circuit parts shown in FIG. 30. Principle parts are as follows:

(i) Elevator bottom sensor 472.

This sensor is used to detect a lower limit position of the large capacity tray 471 equipped with an elevator mechanism for moving the copying paper 60 up and down.

(ii) Interlock switch 473.

This switch is used to detect the opening and closing of a front panel of the large capacity tray 471.

(iii) No-paper sensors 474 and 474'.

This sensor is used to detect that the copying paper 60 stored is running short.

(iv) Size sensors 475 and 475'.

This sensor is used to detect the size of the copying paper 60.

(v) Tray motors 476 and 476'.

This motor is used to drive the elevator mechanism of each tray in order to move up and down a portion of the tray where the copying paper 60 is stored and to feed the paper.

(vi) Set sensor 477.

This sensor is used to detect an upper limit position of the large capacity tray equipped with the elevator mechanism.

(vii) Feed clutches 478 and 478'.

This clutch is used to control copying paper feeding.

(viii) Feed sensors 479 and 479'.

This sensor is used to detect the jamming of the copying paper 60 sent out of the tray.

The large capacity tray 471 is supplied with a.c. power from the output of the noise filter 223 shown in FIG. 8 and d.c. power from the d.c. power supply 228 via the main board 201 also shown in FIG. 8 to operate those circuit parts.

Figure 31:
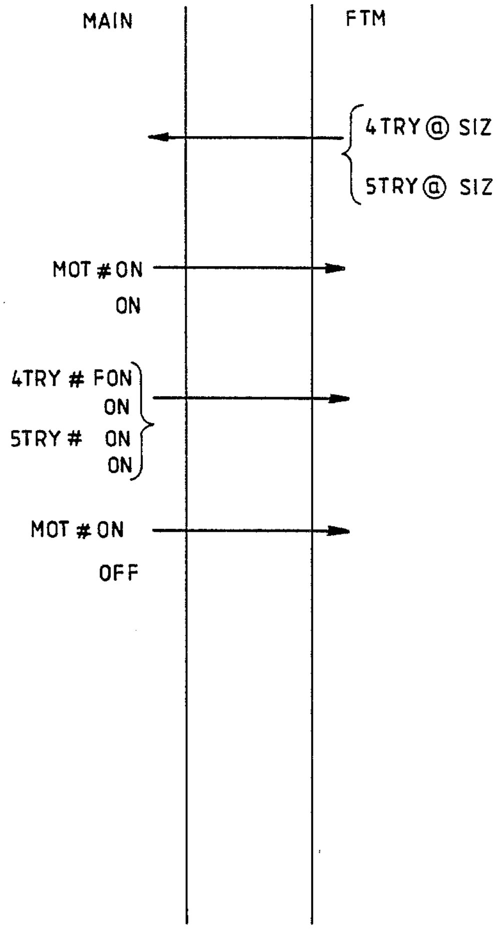
Figure 32:
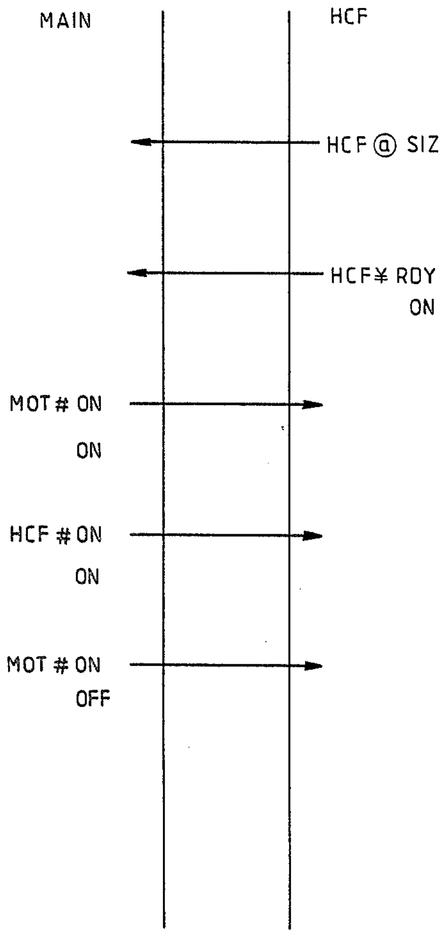

The operational timing of the control system will subsequently be described. FIG. 31 is a diagram exemplifying the operational timing of the fourth and fifth supply trays. FIG. 32 is a diagram exemplifying the operational timing of the large capacity tray.

In connection with the operation of the fourth and fifth supply trays (FTM), the size of paper inserted onto the fourth and fifth supply trays is detected (4TRYS@SIZ, 5TRY@SIZ) while the power is being supplied and transmitted to the base machine. On receiving the MOT#ON signal, the FTM side enters the run mode and is placed in a 4TRY#ON or 5TRY#ON signal standby state. On receiving the 4TRY#ON or 5TRY#ON signal, the FTM side starts feeding paper from the fourth or fifth supply tray. When the paper is completely fed with the interruption of the operation of the base machine, the MOT#ON signal is turned off and the FTM enters the standby mode.

With respect to the operation of the large capacity tray (HCF), the size of paper stored on the large capacity tray is detected (HCF@SIZ) while the power is being supplied and transmitted to the base machine. The HCF elevator is simultaneously elevated and the HCF¥RDY signal is turned on when paper is prepared for feeding. On receiving the MOT#ON thus turned on then, the HCF side enters the run mode and is placed in an HCF#ON signal standby state. On receiving the FCF#ON signal, the HCF side starts feeding paper. When the paper is completely fed with the interruption of the operation of the base machine, the MOT#ON signal is turned off simultaneously with the interruption thereof and the FTM enters the standby mode.

(6-7) Intermediate tray control system.

As set forth above, the paper trays fitted as additional devices include the intermediate tray, the large capacity tray, the fourth and fifth supply trays, ]and the intermediate tray (DDM) among them is, as is obvious from the above description, subjected to complicated operation and controlling that it stocks and feeds copying paper put through a copying process and places the copying side of the paper upside down while stocking it, depending on the function for use. On the contrary, since the large capacity tray, the fourth and fifth supply trays, like other ones, are employed to supply paper, these trays are required only to function as feeders. Consequently, the latter trays are simpler in construction and control than the intermediate tray to the extent that what is equivalent to part of the intermediate tray is used in view of the control system. The details of an intermediate tray control system will subsequently be described.

Figure 33:
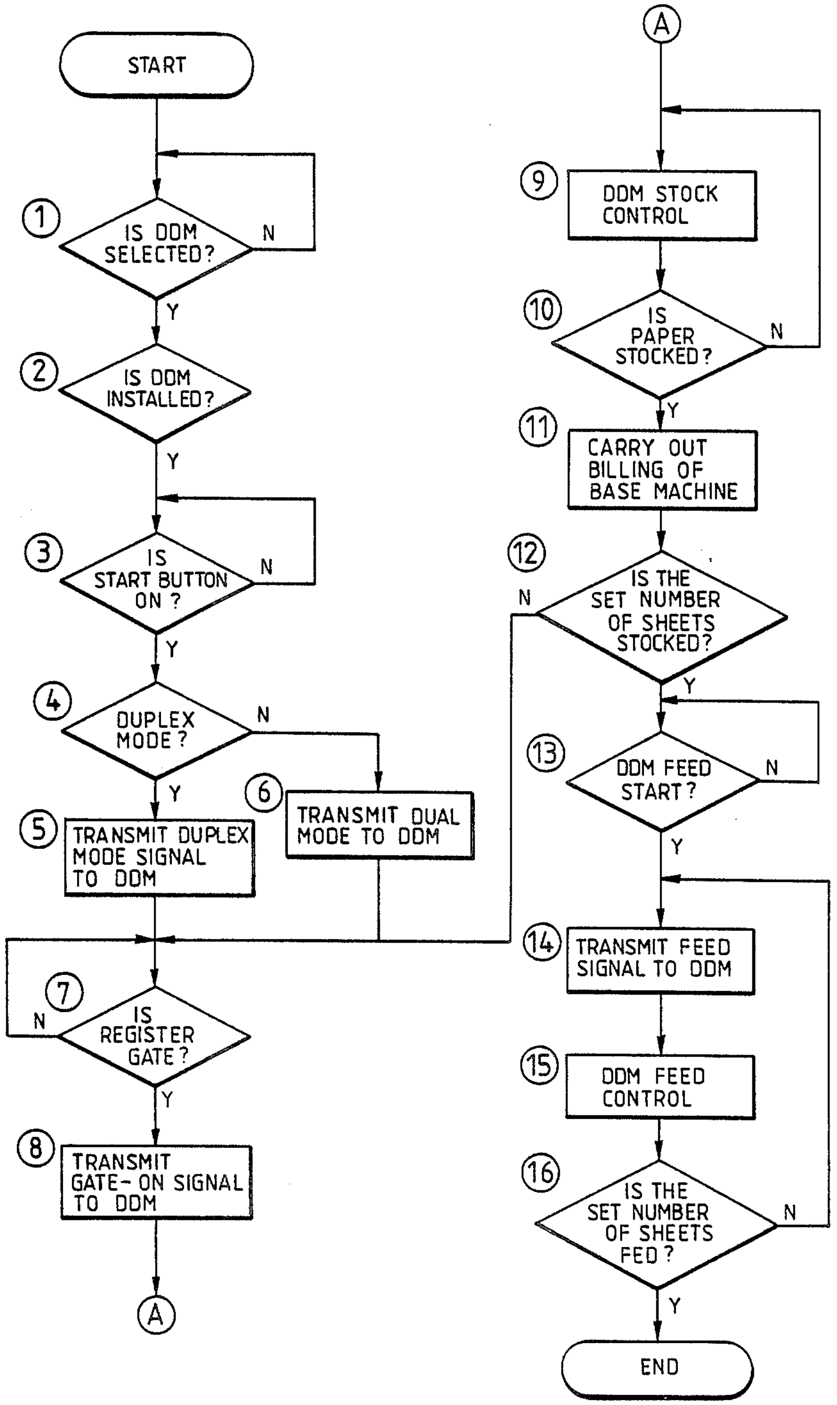
Figure 34:
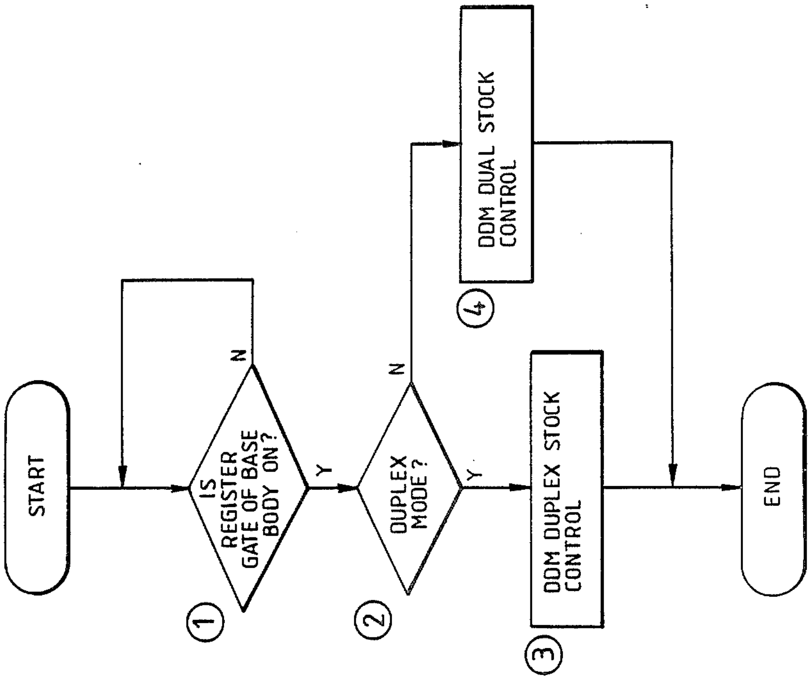

FIG. 33 is a diagram illustrating a general tray control flow, whereas FIG. 34 is a diagram illustrating a stock control process flow for the intermediate tray.

The control of the intermediate tray will be outlined as follows: as shown in FIG. 33, the selection of the intermediate tray is checked by the main controller and, when it is selected, the main controller examines whether the intermediate tray has actually been installed (Steps 1 and 2). If the intermediate tray is installed, the main controller waits for the start button to be turned on and determines either duplex or dual mode is followed and further transmits either duplex or dual mode signal to the tray controller (Steps 3–6). Moreover, the main controller waits until the register gate of the base machine which controls the feeding of copying paper is turned on and transmits the signal indicating the on-state of the register gate thereof (commencement of copy-making operations) to the tray controller (Steps 7 and 8).

On the other hand, the tray controller controls stock on the intermediate tray. When paper is stocked on the intermediate tray, the billing of the base machine is carried out (Steps 9–11). The main controller then returns to Step 7 and repeats the aforesaid process until the set number of sheets of copying paper is stocked and waits for the intermediate tray to start feeding (Steps 12 and 13).

The main controller transmits the feed signal to the tray controller to excite the intermediate tray feed control and repeats this process until the set number of sheets is fed (Steps 14–16).

The stock control on the intermediate tray is, as shown in FIG. 34, exercised in such a manner that the tray controller waits until the register gate of the base machine is turned on, examines whether the duplex mode is followed after it is thus turned on, controls duplex stock on the intermediate tray in the case of the duplex mode or otherwise dual stock thereon. This control is effected by changing the direction of the DDM inverter solenoid 364.

A description will further be given of some examples of control characteristic of the DDM tray control.

Figure 35:
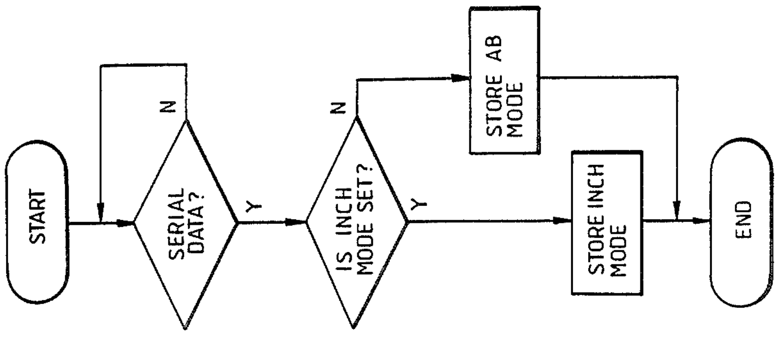
Figure 36A:
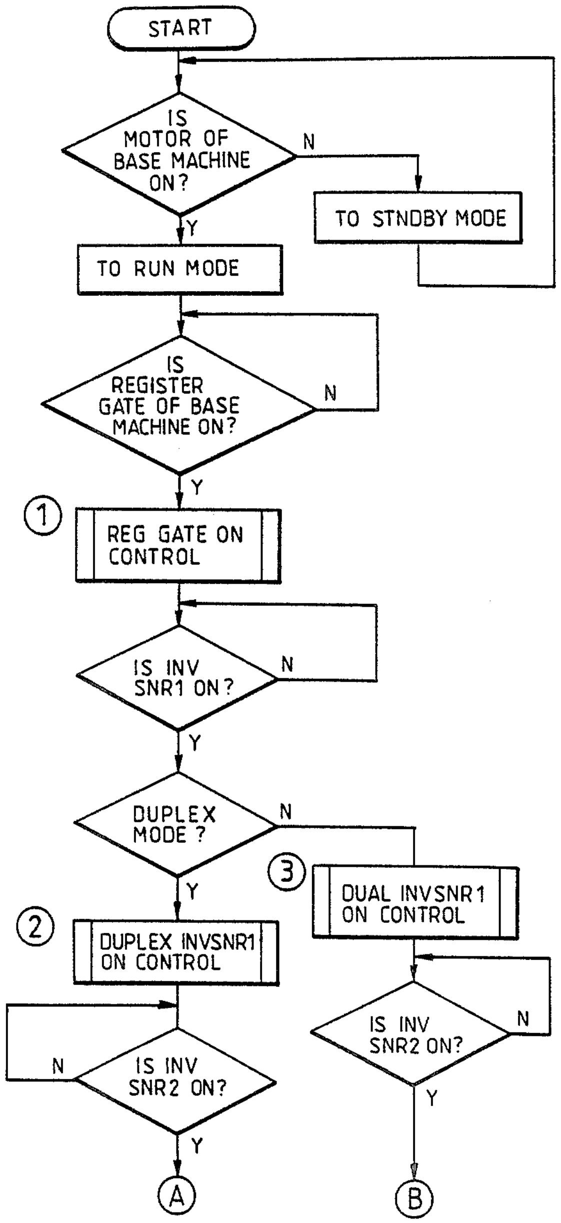
Figure 36B:
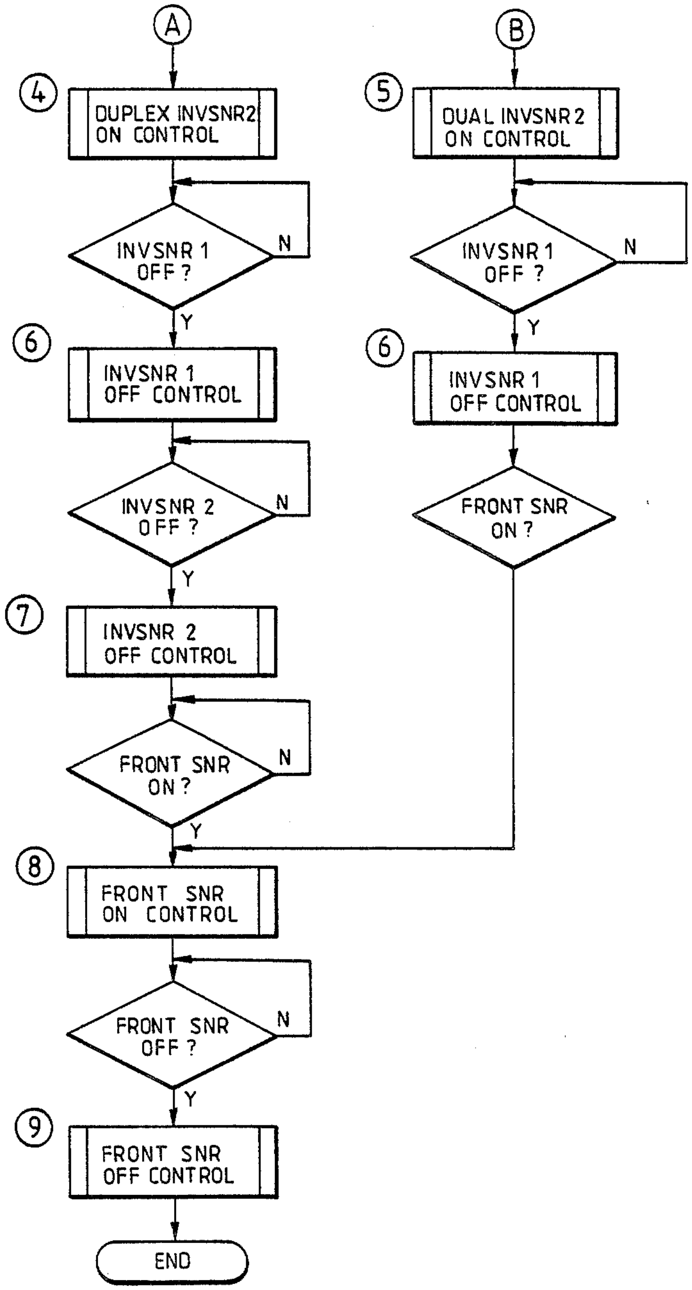
Figure 37:
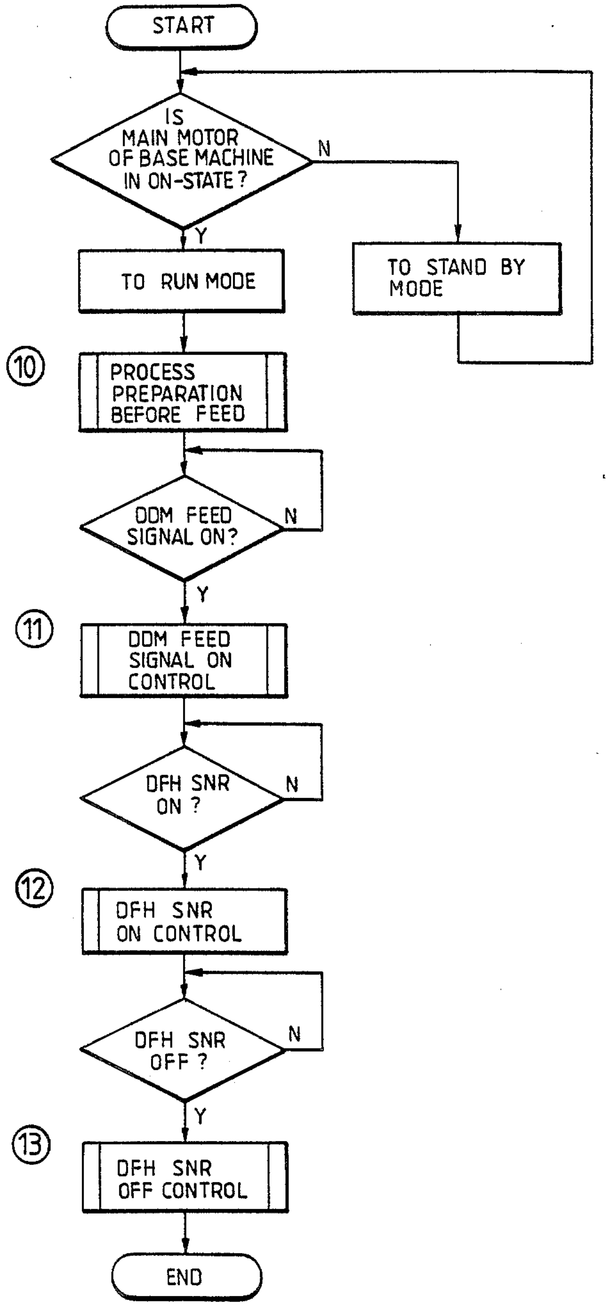
Figure 38:
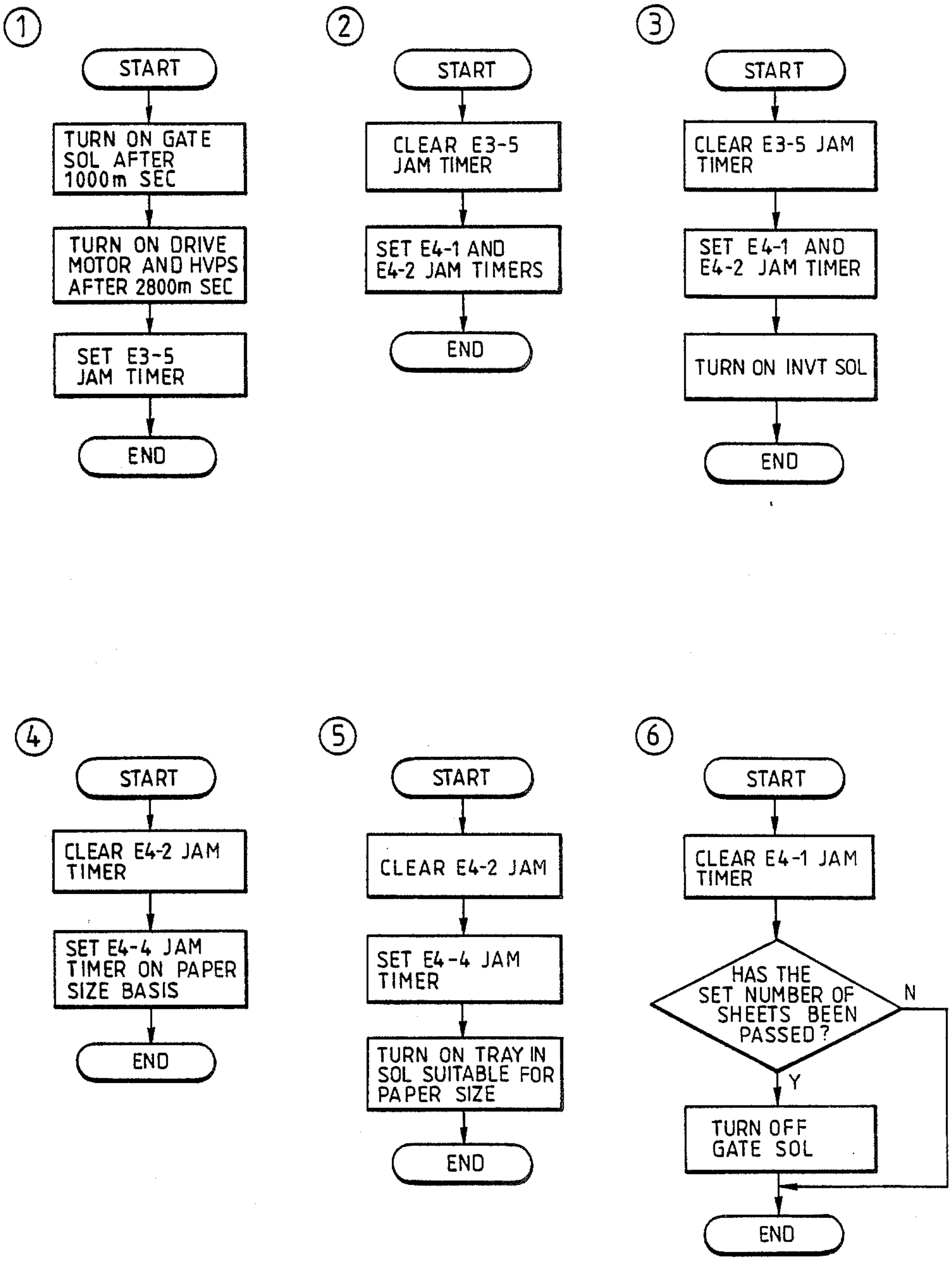
Figure 39:
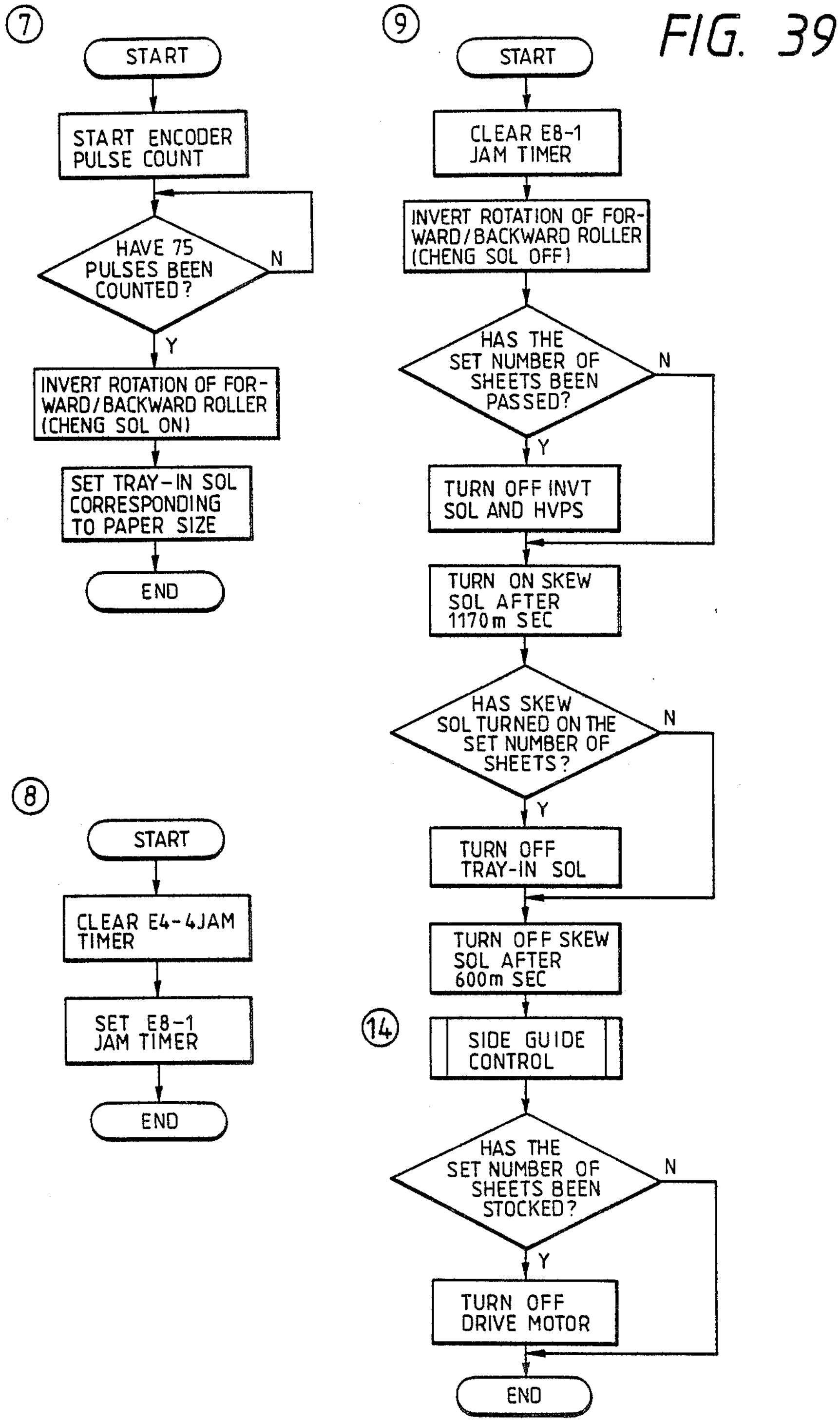
Figure 40:
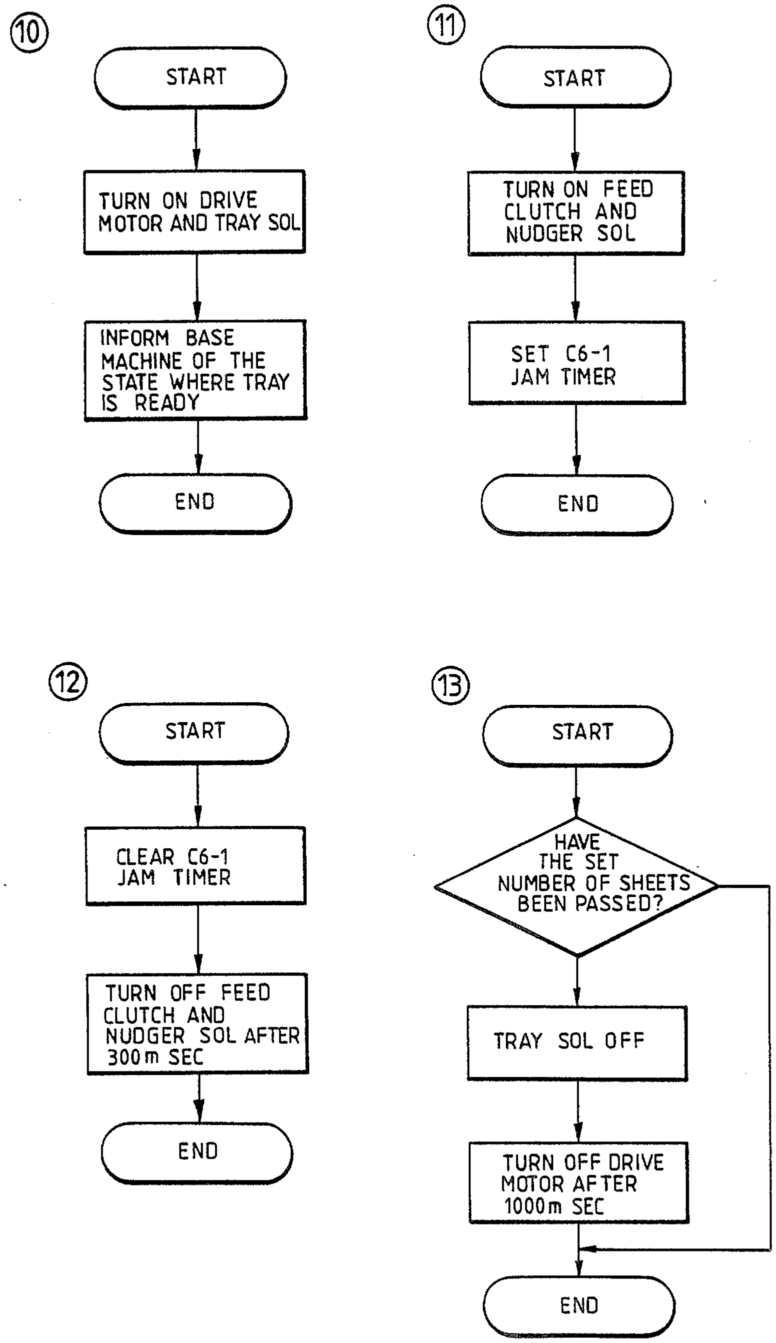

FIG. 35 is a diagram illustrating a size identifying process flow while power is on. FIG. 36 is a diagram illustrating a control flow at the time of a DDM stock mode. FIG. 37 is a diagram illustrating a control flow at the time of DDM feeding. FIGS. 38–40 are illustrative of details of the process steps of FIGS. 35–37.

(i) Control of the DDM tray-in solenoid.

As the intermediate tray 33 is designed so that the front ends of sheets of paper being fed have to be turned up, paper of various sizes cannot be sent in the same feed opening. For this reason, the paper feed opening of the intermediate tray 33 is switched by the DDM tray-in solenoids 355–357 according to the paper size. The switching operation of the DDM tray-in solenoids is defined by classifying the sizes of paper sent from the base machine into four kinds. For A3 size, for example, the DDM tray-in solenoid 355 is turned on; for B4 size, the DDM tray-in solenoid 356 is turned on; for A4 and B5 lengthwise, the DDM tray-in solenoid 357 is turned on; and for A4 and B5 crosswise, all of the DDM tray-in solenoids 355–357 are turned on.

(ii) Size identifying process while power is on (FIG. 35).

Regarding a particular bit (bit 5 of FIG. 22(*a*)), only the initial serial data becomes what determines whether paper for use is of the inch mode. Accordingly, whether the particular bit corresponds to inch mode setting data is examined and the inch or AB mode is set according to the setting data.

(iii) Control in the DDM stock mode (FIG. 36).

The tray controller examines whether or not the main motor 164 of the base machine is held on and, while waiting in the standby mode until it is turned on, sets the run mode when it is turned on.

The tray controller waits until the register gate of the base machine is turned on and controls the register gate thus turned on. As shown in FIG. 38(1), this control comprises the steps of guiding paper to the intermediate tray 33 by turning on the DDM gate solenoid 351 1,000 msec later and setting the E3-5 jam timer (on-state checking of the first DDM inverter sensor 352) by turning on the DDM drive motor 361 and the HVPS illuminator 379 2,800 msec later.

Then the tray controller waits until the first DDM inverter sensor 352 is turned on and, when it is turned on, it examines whether the duplex mode has been established and controls the first DDM inverter sensor in the on-state by means of the duplex mode when the answer is Yes and by the dual mode when it is No.

In the control of the first DDM inverter sensor in the on-state by the duplex mode, an E3-5 jam timer is cleared as shown in FIG. 38(2) (completion of the on-state checking of the first DDM inverter sensor 352) and E4-1 and E4-2 jam timers are set (Off-state checking of the first DDM inverter sensor 352 and commencement of on-state checking of the second DDM inverter sensor 353). In the control of the first DDM inverter sensor in the on-state by the dual mode, the E3-5 jam timer is cleared as shown in FIG. 38(3) and E4-1 and E4-2 jam timers are set and further the DDM inverter solenoid 364 is turned on.

After exercising the control of the DDM inverter sensor in the on-state by the duplex mode, the tray controller waits until the second DDM inverter sensor 353 is turned on, controls it in the on-state by the duplex mode, clears an E4-2 jam timer as shown in FIG. 38(4) (completion of the on-state checking of the second DDM inverter sensor 353) and sets an E4-4 jam timer on a paper size basis (commencement of the on-state checking of the DDM front sensor 372).

Subsequently, the tray controller waits until the DDM inverter sensor 352 is turned off and controls the first DDM inverter sensor in the off-state. In this control, the tray controller clears, as shown in FIG. 38 (6), the E4-1 jam timer (Completion of the off-state checking of the first DDM inverter sensor 352) and turns off the DDM gate solenoid 351 when the set number of sheets has been passed therethrough.

The tray controller then controls the second DDM inverter sensor while waiting for the DDM inverter sensor 353 to be turned off. In this control, encoder pulses start being counted as shown in FIG. 39(7) and, when 75 pulses have been counted, the tray controller turns on the DDM forward/backward switching solenoid 375 to invert the rotation of the forward/backward roller 368, so that one of the DDM tray-in solenoids 355–357 corresponding to the paper size is turned on. By 75 pulse counts means the number of counts added during a period from the time when the rear end of paper passes through the second DDM inverter sensor 353 and further the DDM inverter solenoid 364 to the time when the paper has been conveyed up to the position where it can be inverted.

After controlling the DDM tray-in solenoids 355–357 in the on-state, the tray controller waits until the DDM front sensor 372 is turned on, clears the E4-4 jam timer under the control of the DDM front sensor in the on-state as shown in FIG. 39(8) (completion of the on-state checking of the DDM front sensor 372), simultaneously sets an E8-1 jam timer (commencement of the off-state checking of the DDM front sensor 372) and controls the DDM front sensor in the off-state while waiting for the DDM front sensor 372 to be turned off. In this control, the tray controller clears, as shown in FIG. 39(9), the E8-1 jam timer (completion of the off-state of the DDM front sensor 372), forwardly rotates the forward/backward roller 368 by turning off the DDM forward/backward switching solenoid 375, and turns on the skew solenoid 377 1,170 msec later immediately when the set number of sheets has not been passed therethrough or by turning off the DDM inverter solenoid 364 and the HVPS illuminator 379 when the set number of sheets has been passed therethrough. The tray controller further controls the side guide 600 msec later than turning off the DDM tray-in solenoids 355–357 immediately until the skew solenoid 377 turns on the set number of sheets or by turning off the DDM tray-in solenoids 355–357 when the set number of sheets is turned on, and turns off the DDM drive motor when the set number of sheets has been stocked.

After controlling the DDM inverter sensor in the on-state by the dual mode, the tray controller controls the second DDM inverter sensor in the on-state while waiting for the second DDM inverter sensor 353 to be turned on, clears the E4-2 jam timer as shown in FIG. 38(5), and sets the E4-4 jam timer, whereby one of the DDM tray-in solenoids 355–357 which corresponds to the paper size is held on. Subsequently, like the case of the duplex mode, the tray controller waits for the DDM inverter sensor 352 to be turned off and controls the first DDM inverter sensor in the off-state. As in the case of the duplex mode, the tray controller waits for the DDM front sensor 372 to be turned on and proceeds to controlling the DDM front sensor in the on-state likewise.

(iv) Control at the time of DDM feed (FIG. 38).

The tray controller examines whether or not the main motor 164 of the base machine is held on and, while waiting in the standby mode until it is turned on, sets the run mode when it is turned on.

The tray controller then performs a pre-feed preparatory process. In this process, the tray controller turns on the DDM drive motor 361 and the DDM tray solenoid 378 for moving the tray by 19 mm respectively and informs the main controller of the situation in which the tray is ready for operation about 1.2 sec later (after the period during which the tray moves by 19 mm).

Then tray controller waits until the DDM feed signal is turned on and controls the DDM feed signal in the on-state. In this control, the tray controller turns on the DDM feed clutch 363 and the DDM measure roll solenoid 358 as shown in FIG. 40(11) to have the feed started and sets a C6-1 jam timer (commencement of the on-state checking of the D/F/H sensor 369).

The tray, controller further waits for the D/F/H sensor 369 to be turned on and control it in the on-state In this control, the tray controller clears the C6-1 jam timer (termination of the on-state checking of the D/F/H sensor 369) and turns off the DDM feed clutch 363 and the DDM measure roll solenoid 358 300 msec later.

Subsequently, the tray controller waits for the D/F/H sensor 369 to be turned off and controls it in the off-state. In this control, the tray controller examines whether the set number of sheets has passed therethrough as shown in FIG. 40(13) and turns off the DDM tray solenoid 378 when the set number of sheets has passed therethrough and further DDM drive motor 361 1,000 msec later.

(v) Side guide control.

Figure 41A:
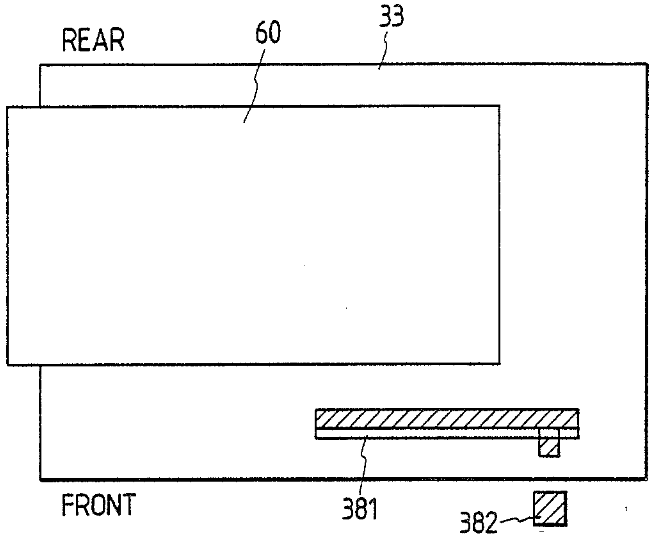
Figure 41B:
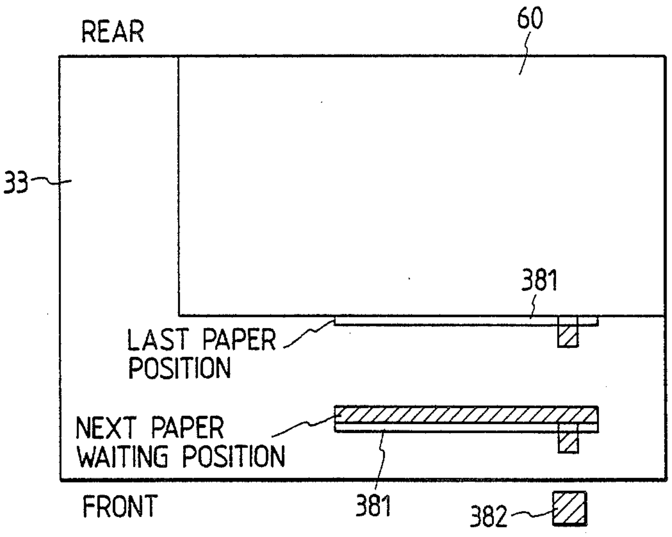

FIG. 41 is a diagram explanatory of the operation of a side guide with the intermediate tray viewed from the upside.

The intermediate tray 33 is arranged so that its rear side is normally positioned slightly in the recess of the paper feed line as shown in FIG. 41(*a*). This arrangement is intended to prevent paper from mounting on the rear side edge of the intermediate tray 33, provided the rear side is accurately mated with the feed line.

The paper on the intermediate tray 33 is set fre erelative to the feed and vartical directions and consequently the problem is that the paper tends to shift it position because of skew while it is fed and when the intermediate tray 33 is drawn out. The side guide is installed to prevent the paper shifting and the skew on the intermediate tray 33.

The side guide 381 moves in the front direction shown by arrow A simultaneously when the DDM drive motor 361 is turned on and, after the home position is detected by the home position sensor 382 (GUIDE#HOME ON), then moves in the rear direction and stops at a position corresponding to the size of paper sent from the base machine, e.g., the width of paper +19 mm apart from the rear side of the intermediate tray. Provided the side guide 381 remains at the home position from the beginning, the main motor 164 of the base machine moves in the rear direction simultaneously when it is turned on. The paper 60 is sent onto the intermediate tray 33 in this state and, when the skew solenoid 377 is turned on/off, the side guide moves in the rear direction by 19 mm once and moves back in the front direction 19 mm again and then stops thereat while waiting the next supply of paper. When the set number of sheets of paper is sent in, the side guide 381 stops at a position equivalent to the width of paper as shown in FIG. 41(*b*). When the paper thus sent in is fed, the side guide moves in the front direction to align the intermediate tray 33 with a paper feed line. The side guide is driven by a side guide motor 376.

A stepping motor is employed as the side guide motor 376 and motor pulses are outputted from the tray controller 502. Assuming a pulse of 294 PPS is used, the side guide will move at a speed of 125 mm/sec and covers a distance of approximately 0.425 mm per pulse. The control of the side guide in terms of the distance covered thereby is conducted by counting the pulses applied to the stepping motor. Moreover, the switching of the side guide motor back and forth at the time of paper alignment is effected in such a manner that it is stopped by two pulses.

Figure 42:
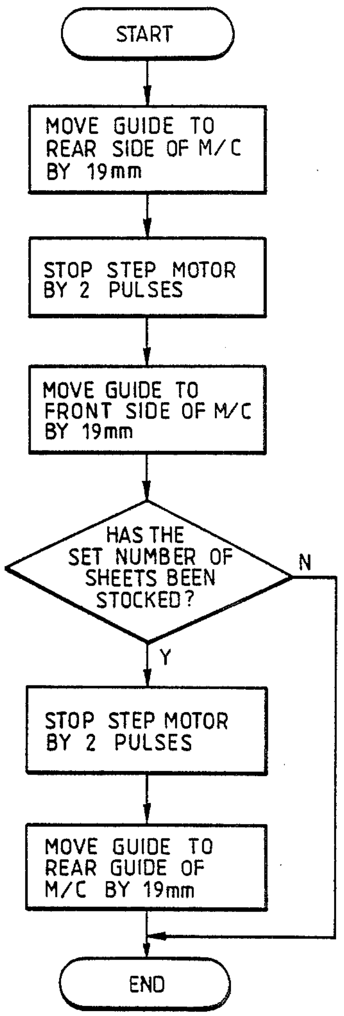
Figure 43:
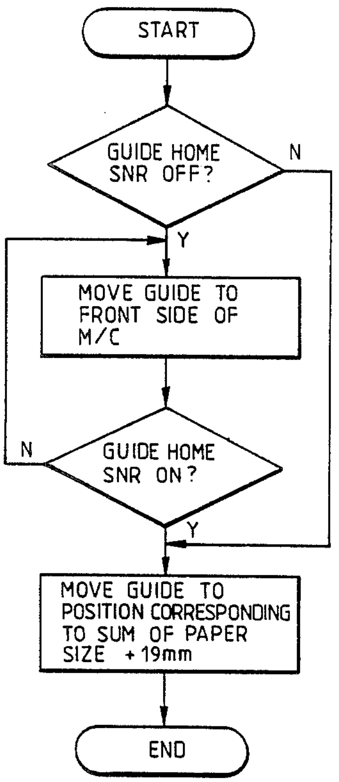
Figure 44:
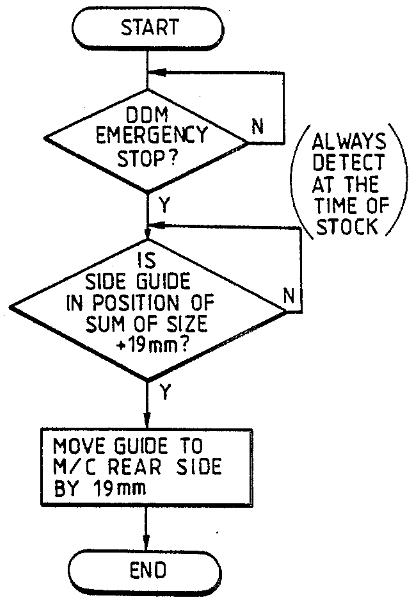
Figure 45:
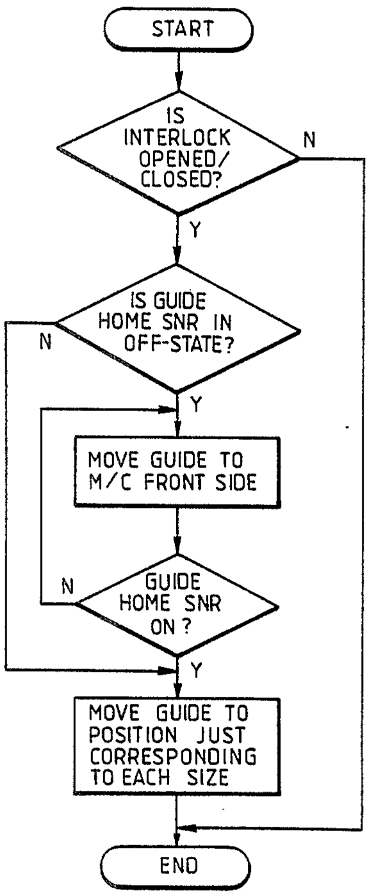

FIG. 42 is a diagram illustrating a side guide control flow with the DDM front sensor in the off-state at the time of the stock mode. FIG. 43 is a diagram illustrating a side guide initial setting control flow in the stock mode. FIG. 44 is a diagram illustrating a side guide control flow at the time of DDM em,emergency interruption. FIG. 45 is a diagram illustrating a side guide control flow after the closing of the DDM tray interlock followed by the opening thereof in the feed mode.

In the control of the side guide with the DDM front sensor in the off-state at the time of the stock mode, the side guide motor 376 is, as shown in FIG. 42, driven to move the side guide 381 to the rear side of the base machine by 19 mm and then stop it by two pulses. This is intended to completely stop the movement of the side guide 381 by making it absorb the inertia Subsequently, the side guide motor 376 is driven to move the side guide 381 to the front side of the base machine by 19 mm and, provided the set number of sheets been stocked, to stop it by two pulses. The side guide 381 is then moved to the rear side of the base machine by 19 mm again.

In the initial setting control of the side guide in the stock mode, the guide home sensor 382 is, as shown in FIG. 43, examined if it is in the off-state and, if it is in the off-state, the side guide 381 is moved to the front side of the base machine until it is turned on. The side guide 381 is further moved up to a position corresponding to the sum of the paper size and 19 mm.

In the control of the side guide at the time of DDM emergency interruption, the DDM emergency interruption is always monitored at the time of stock operations as shown in FIG. 44. At the time of the DDM emergency interruption, the side guide is moved to the rear side of the base machine by 19 mm after it has reached to the position corresponding to the sum of the paper size and 19 mm. In other words, when the base machine stops operating because of jamming or interlock opening while the DDM is performing the stock operations, the DDM makes an emergency stop. If the side guide 381 is stopped immediately at this time, the paper stored in the DDM is left free. Moreover, if the tray is drawn out in that state to cause paper shifting, jamming and skew may occur when the operation is restarted. No problem is posed while the side guide 381 remains at the paper size position without performing the stock operations. While the side guide 381 performs the stock operations, i.e., when the side guide is not located at the paper size position, however, it is moved to and stopped at the paper size position after confirming the position corresponding to the sum of the paper size and 19 mm as its reference operating position. This is because, if the side guide 381 is moved without confirming the position corresponding to the sum of the paper size and 19 mm, the position at which the side guide is stopped will shift from the paper size position.

In the control of the side guide after the closing of the DDM tray interlock followed by the opening thereof in the feed mode, the side guide 381 is moved to the front side of the base machine until the guide home sensor 382 is turned off, i.e., it is moved over the position of the guide home sensor 382 once while the guide home sensor is held off when the DDM tray is switched to cause the tray interlock 371 to be on/off as shown in FIG. 45 and then it is moved to the paper size position.

As is obvious from the above description of the present invention, the serial communication lines connect the main controller for controlling the paper trays, and control signals instructing data regarding kinds and size of paper in stock, emergency interruption, etc. are transmitted from the main controller to the intermediate tray, whereas the tray controller sets stock preparatory conditions with the kinds and size of paper thus instructed, and the stock operation is completely performed even when the emergency interruption of the operation of the base machine occurs during the stock operation to ensure that paper is kept in stock on the intermediate tray. Moreover, even if the operation of the base machine is interrupted in case of emergency because of jamming and interlock opening while paper is being laid in stock on the intermediate tray, the paper in stock is surely held by the side guide, whereby the paper is never set free. Accordingly, paper is prevented from being shifted as the tray is drawn out and, even when the operation of the base machine is restarted, the paper is prevented from being shifted because of jamming and skew. Further, by transmitting data on the kinds and size of paper on a bit basis, quantity can be minimized and, particularly by providing the data on the kind of paper only through initial data transmission, the relevant bits can be allotted to the transmission of other items of data on and after second occasion, so that data transmission efficiency because improvable.

What is claimed is:

1. A paper tray control system, comprising:

a recording apparatus for recording image data on a paper, to which additional devices are attachable;

paper tray means installed in said recording apparatus as said additional devices for stocking the paper on which the image data has been recorded;

main control means for controlling said recording apparatus and for generating an instruction;

tray control means, separated from said main control means, for controlling said paper tray means;

communication line means connected between said main control means and said tray control means, wherein said tray control means receives said instruction from said main control means through said communication line means to control said paper tray means according to said instruction; and wherein said tray control means is provided with memory means which stores programs for controlling said paper tray means.

2. A paper tray control system as claimed in claim 1, wherein said communication line means comprises a serial communication line.

3. A paper tray control system as claimed in claim 1, wherein said paper tray means comprises an intermediate tray having duplex and dual modes for temporarily accommodating the paper already used for recording at least once.

4. A paper tray control system as claimed in claim 1, wherein said paper tray means comprises a large capacity tray.

5. A paper tray control system as claimed in claim 1, wherein said paper tray means comprises an additional paper supply tray.

6. A paper control system as claimed in claim 1, wherein said tray control means is provided with a paper stock control mechanism for controlling the stock of a paper in said paper tray according to said instruction from said main control means.

7. A paper tray control system as claimed in claim 6, wherein said paper tray means is an intermediate tray having duplex and dual modes.

8. A paper tray control system as claimed in claim 6, wherein said communication line means comprises a serial communication line.

9. A paper tray control system as claimed in claim 6, wherein data on kinds of paper is transmitted with a bit different from that used for size designating data through said communication line means from said main control means to said tray control means.

10. A paper tray control system as claimed in claim 6, wherein said tray control means makes the operation of said paper stock control mechanism stop after a predetermined period of time from the time when said tray control means receives an emergency interruption instruction from said main control means.

11. A paper tray control system as claimed in claim 6, wherein said paper stock control mechanism is provided with guide means which moves to a paper stock position corresponding to paper size from the outside of paper to be stocked to stop at the time when stock operations are terminated.

* * * * *

UNITED STATES PATENT AND TRADEMARK OFFICE

CERTIFICATE OF CORRECTION

PATENT NO. : 4,970,544

DATED : November 13, 1990

INVENTOR(S) : Tsutomu Furusawa et al.

It is certified that error appears in the above-identified patent and that said Letters Patent is hereby corrected as shown below:

Title Page, Foreign Application Priority Data, change "304169" to --62-304169--;

Claim 6, Column 40, Line 40, after "paper" insert --tray--.

Signed and Sealed this

Eighth Day of December, 1992

Attest:

DOUGLAS B. COMER

Attesting Officer

Acting Commissioner of Patents and Trademarks